United States Patent
Kamiya et al.

(10) Patent No.: US 7,565,917 B2
(45) Date of Patent: Jul. 28, 2009

(54) CONNECTOR, FLUID SUPPLY APPARATUS, MOVABLE BODY, FLUID SUPPLY SYSTEM, AND CONNECTOR CONNECTION METHOD AND CONNECTOR SEPARATION METHOD

(75) Inventors: Takanobu Kamiya, Nagoya (JP);
Katsuhiko Akiyama, Nagoya (JP);
Takashi Maemura, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 478 days.

(21) Appl. No.: 11/111,945

(22) Filed: Apr. 22, 2005

(65) Prior Publication Data
US 2005/0247352 A1    Nov. 10, 2005

(30) Foreign Application Priority Data
Apr. 26, 2004    (JP)    ............... 2004-130525

(51) Int. Cl.
*F16L 37/32*    (2006.01)
(52) U.S. Cl. .............. 137/614.04; 137/614.05; 137/240
(58) Field of Classification Search ............ 137/614.04, 137/614.05, 614.03, 240
See application file for complete search history.

(56) References Cited

U.S. PATENT DOCUMENTS

| | | | |
|---|---|---|---|
| 3,976,099 A * | 8/1976 | Russell | ............ 137/614 |
| 4,582,295 A * | 4/1986 | Kugler et al. | ......... 137/614.04 |
| 5,365,973 A | 11/1994 | Fink, Jr. et al. | |
| 6,655,656 B2 * | 12/2003 | Maldavs | ............... 137/614.03 |
| 6,830,059 B1 * | 12/2004 | Zeiber et al. | ........... 137/614.03 |
| 7,182,098 B2 * | 2/2007 | Tilling et al. | ........... 137/614.04 |

FOREIGN PATENT DOCUMENTS

| | | |
|---|---|---|
| DE | 40 27 414 C1 | 2/1992 |
| EP | 0 650 005 A1 | 4/1995 |
| GB | 1 372 262 | 10/1974 |
| JP | 2003-113973 | 4/2003 |

OTHER PUBLICATIONS

Rolf Trill, "Hydrogen as Alternative Fuel", BMW CleanEnergy Seminar, Linde AGA, Mar. 19-20, 2002.

* cited by examiner

*Primary Examiner*—Kevin L Lee
(74) *Attorney, Agent, or Firm*—Wenderoth, Lind & Ponack, L.L.P.

(57) ABSTRACT

The invention provides a small, lightweight connector that is appropriate for the handling of fluids, a fluid supply apparatus that makes use thereof, a movable body, a fluid supply system, a connector connection method, and a connector separation method. A supply side connector provided on a fluid supply apparatus, and an inlet side connector, each have an inner cylinder which constitutes a connection part of both supply lines, and an outer cylinder which encloses the inner cylinder and which constitutes a connection part of both vent lines. A second supply valve is provided on the respective supply lines, and carries out switching between restriction and release of the flow of the fluid through the supply line by changing the position in the axial direction of the inner cylinder. A second vent valve is provided on the vent line of the inlet side connector, and carries out switching between restriction and release of the flow of the fluid through the vent line.

15 Claims, 9 Drawing Sheets

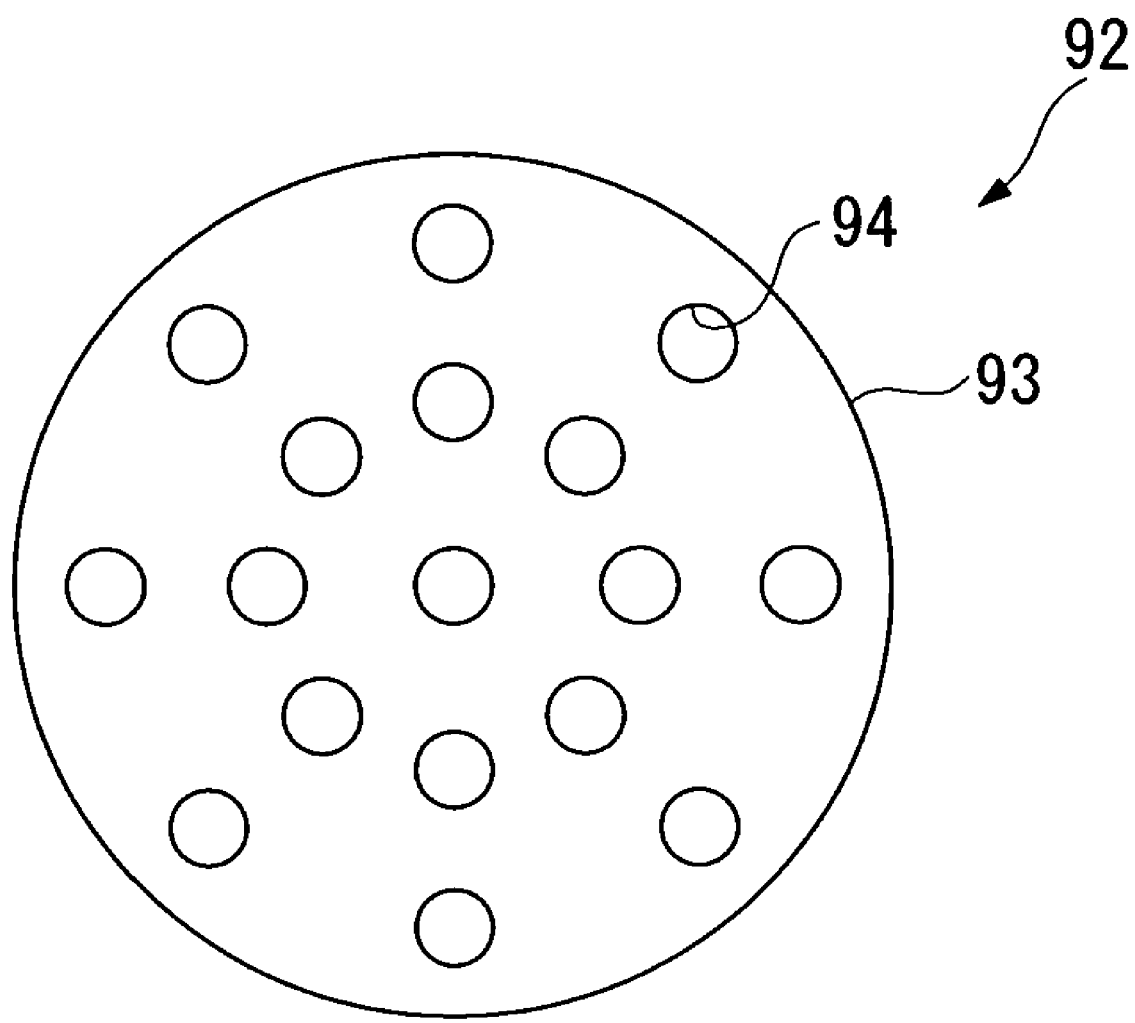

CONNECTOR, FLUID SUPPLY APPARATUS, MOVABLE BODY, FLUID SUPPLY SYSTEM, AND CONNECTOR CONNECTION METHOD AND CONNECTOR SEPARATION METHOD

BACKGROUND OF THE INVENTION

1. Field of the Invention

The present invention relates to a connector that connects a fluid supply apparatus to an object of supply of a fluid, a fluid supply apparatus making use thereof, a moveable body, a fluid supply system, a method of connecting the connector, and a method of separating the connector.

2. Description of the Related Art

With an increase in consideration given to environmental problems in recent years, development of technology that uses hydrogen, which is a clean energy source, in place of fossil fuels that generate harmful combustion gas is progressing.

As devices that use hydrogen as an energy source there are, for instance, a hydrogen-fueled vehicle, a fuel cell vehicle, and a fuel cell as a general-purpose power supply, and so forth. In these devices, the energy source, hydrogen, is saved for instance in a liquid state in hydrogen tanks, which are used one by one.

Since liquefied hydrogen is a fluid of an extremely low temperature of about −253° C., a device that has an insulation structure and other special structures is used for the handling operations thereof. For instance, a special structure to prevent the ingress of atmospheric moisture into the interior of a coupling used to detachably connect a hydrogen tank and a hydrogen supply pipe, at the time of disconnection, is provided on the coupling in addition to the insulation structure.

As a supply system for supplying liquefied hydrogen to a hydrogen tank, for example, a cryogenic pipe coupling described in Patent Document 1 below has been used.

This cryogenic coupling is used to supply fuel to a rocket, and has a pair of ball valves, and a male and a female coupling which fit together through the inside of these ball valves when these ball valves are open.

As the connection part of the piping of this cryogenic coupling is closed off by the ball valve upon separation of the piping, ingress of atmospheric moisture or foreign substances and so forth into the interior part of the coupling is prevented.

[Patent Document 1]

Japanese Unexamined Patent Application, First Publication No. 2003-113973 (paragraph [0017] to [0022] and FIG. 1)

In the supply of liquefied hydrogen to a hydrogen-fueled vehicle by a hydrogen supply stand or the like (a facility that corresponds to a gas station for a fossil fuel vehicle), it is assumed that the connection of a hydrogen supply pipe to a hydrogen tank of the hydrogen-fueled vehicle is to be carried out manually by an operator, and therefore employment of a smaller, lighter coupling is preferable to improve the manageability of the coupling by the operator.

However, since the cryogenic coupling described in Patent Document 1 is for use in an application in which safety and certainty are emphasized, like the fueling of a rocket and so forth, as stated above, the structure is complex. Therefore, since the coupling itself becomes large-scale and heavy, handling is not easy.

Moreover, in this cryogenic coupling, the ball valve and the male and female couplings have to be operated respectively in order to switch the allowance and the restriction of the flow of the fluid through the cryogenic coupling, and handling is not easy.

SUMMARY OF THE INVENTION

The present invention has been developed in consideration of such circumstances, and aims to provide a small, lightweight connector that is appropriate for the handling of fluids, particularly cryogenic fluids, a fluid supply apparatus that makes use thereof, a movable body, a fluid supply system, a connector connection method, and a connector separation method.

In order to solve the above mentioned problems, a connector, a fluid supply apparatus making use thereof, a movable body, a fluid supply system, a connector connection method, and a connector separation method, of the present invention employ the following means.

That is to say, the connector according to the present invention is a connector that is used in the connection, to an object of supply, of a supply line that is used for the supply of fluid from a fluid supply apparatus to the object of supply, and a vent line that is used for the return of fluid from the object of supply to the fluid supply apparatus, and that constitutes a part of the supply line and the vent line itself, and comprises: a supply side connector provided on the fluid supply apparatus; an inlet side connector that is coupled detachably to the supply side connector, provided on the object of supply; supply valves that carry out restriction and allowance of the flow of fluid through the supply lines, provided on the respective supply lines of the supply side connector and the inlet side connector; a vent valve that carries out restriction and allowance of the flow of the fluid through the vent lines, provided on the vent line of the inlet side connector; and a valve opening and closing apparatus that operates the opening and closing of the supply valves and the vent valve, wherein the supply side connector and the inlet side connector each comprise inner cylinders that constitute the connection parts of both the supply lines, and outer cylinders that enclose the inner cylinders and that constitute the connections parts of both the vent lines, the supply valves are provided in the inner cylinders, and are of a construction such as to carry out switching between restriction and release of the flow of the fluid through the supply lines by changing their positions in the axial direction of the inner cylinders, the vent valve is provided between the outer cylinder and the inner cylinder, and are of a construction such as to carry out switching between restriction and release of the flow of the fluid through the vent lines by changing its position in the aforementioned axial direction, and the valve opening and closing apparatus is of a construction such as to operate opening and closing of the supply valves and the vent valves by respectively moving them in the axial direction.

In a connector constructed in this manner, the supply valves and the vent valves are closed in a state in which the supply side connector and the inlet side connector are separated, and by operating the valve opening and closing apparatus in a state in which the supply side connector and the inlet side connector are coupled, and opening the supply valves and the vent valves, connection of both the supply lines and connection of both the vent lines of the supply side connector and the inlet side connector is carried out, and supply of the fluid from the fluid supply apparatus to the object of supply is carried out.

In this connector, since the return of fluid from the object of supply to the fluid supply apparatus can be carried out in parallel with the supply of fluid to the object of supply, fluid that already exists in the object of supply is quickly replaced with fluid newly supplied to the object of supply, and the supply of fluid to the object of supply can be carried out expeditiously.

Moreover, by carrying out the separation of the supply side connector and the inlet side connector with the supply valve and the vent valve in a closed state, fluid can be prevented from leaking from the vent line and the supply line on separation.

In a connector constructed in this manner, a part of the supply line and the vent line is constructed by the inner cylinder and the outer cylinder, and the supply line and the vent line are a dual pipe construction inside the connector. Therefore, this connector can be achieved in a smaller size than the case in which the supply line and the vent line are respectively constructed by separate piping.

Also, in this connector, the inner cylinder constitutes the supply line, and the outer cylinder and the inner cylinder constitute the vent line, and they are of a construction in which the circumference of the supply line is enclosed by the vent line. Therefore, in the case of supplying a liquid having a large difference in temperature from the surrounding atmosphere, the vent line and the fluid inside the vent line act as a heat insulation layer, and hence the connector can be achieved without the provision of a large scale heat insulation construction.

Moreover, the supply valves are provided in the inner cylinders in this connector, the vent valve is provided in the outer cylinder, and these supply valves and vent valve are of a composition such that the change between restriction and allowance of the flow of the fluid can be carried out by respectively displacing them in the axial direction of the inner cylinders.

Thus, since all valves are supplied in a dual pipe construction in this connector, the size of the connector can be kept to a minimum.

Here, popped valves can be employed for instance as the supply valves and the vent valve.

Also, in this connector the construction may be such that, the supply valve of the supply side connector includes a supply side valve body that opens the supply line in a state of being positioned on the upstream side on the supply line of a shut off position that shuts off the supply line, and a first biasing member that biases the supply side valve body toward the downstream side of the supply line, the supply valve of the inlet side connector includes an inlet side valve body that opens the supply line in a state of being positioned on the downstream side on the supply line of a shut off position that shuts off the supply line, and a second biasing member that biases the inlet side valve body toward the upstream side of the supply line, wherein the vent valve includes a vent side valve body that opens the vent line in a state of being positioned on the upstream side on the vent line of a shut off position that shuts off the vent line, and a third biasing member that biases the vent side valve body toward the downstream side of the vent line, wherein an end connection of the outer cylinder of the supply side connector is of a construction such as to be projected further than an end connection of the inner cylinder of the supply side connector, and to be inserted into the outer cylinder of the inlet side connector in a process in which the supply side connector and the inlet side connector are coupled, wherein inside the inner cylinder of the inlet side connector there is provided a first presser part that contacts the supply side valve body in a state in which the outer cylinder of the supply side connector is inserted into the outer cylinder of the inlet side connector, and moves it from the shut off position toward the upstream side on the supply line, wherein inside the inner cylinder of the supply side connector there is provided a second presser part that contacts the inlet side valve body in a state in which both the inner cylinders are connected, and moves it from the shut off position toward the downstream side of the supply line, wherein on the outer cylinder of the supply side connector there is provided a third presser part that contacts the vent valve body in a state in which the outer cylinder of the supply side connector is inserted into the outer cylinder of the inlet side connector and both the inner cylinders are connected, and moves it from the shut off position toward the upstream side of the supply line, and wherein the first biasing member, the second biasing member, the third biasing member, the first presser part, the second presser part, and the third presser part constitute the valve opening and closing apparatus.

In a connector constructed in this manner, since the connection end of the outer cylinder of the supply side connector is projected more than the connection end of the inner cylinder of the supply side connector, the connection of both the outer cylinders is carried out before the connection of both the inner cylinders in the process of engaging the supply side connector and the inlet side connector. Moreover, both the outer cylinders are connected by being put in a state in which the connection end of the outer cylinder of the supply side connector is inserted into the connection end of the outer cylinder of the inlet side connector.

Then, in a state in which the outer cylinder of the supply side connector is inserted into the outer cylinder of the inlet side connector, the first presser part, provided inside the inner cylinder of the inlet side connector, contacts with the supply side valve body of the supply side connector so that the supply side valve body is moved from the shut off position to the upstream side of the supply line and the supply valve of the supply side connector is opened. As a result, in the interval until the outer cylinder is inserted further and both the inner cylinders connect, fluid is supplied from the supply line of the supply side connector, and flushing of the connection parts of both the inner cylinders and the connection parts of both the outer cylinders is carried out by this fluid. Here, the fluid used for this flushing is returned to the fluid supply apparatus through the vent line of the supply side connector.

Then, when both the inner cylinders are connected, the second presser part, provided inside the inner cylinder of the supply side connector, contacts with the inlet side valve body of the inlet side connector so that the inlet side valve body is moved from the shut off position to the down stream side of the supply line, and the supply valve of the supply side connector is opened. As a result, the supply line from the fluid supply apparatus to the object of supply is opened, and the supply of fluid from the fluid supply apparatus to the object of supply begins.

Also, with both the inner cylinders connected in this manner, the third presser part, provided on the outer cylinder of the supply side connector, contacts with the vent side valve body of the inlet side connector so that the vent side valve body is moved from the shut off position to the up stream side of the vent line, and the vent valve is opened. As a result, the vent line from the object of supply to the fluid supply apparatus is opened, and the return of fluid from the object of supply to the fluid supply apparatus begins.

Conversely, the separation of the supply side connector and the inlet side connector is carried out by drawing out the outer cylinder of the supply side connector from the outer cylinder of the inlet side connector.

In this separation process, the separation of the inner cylinders is carried out before the separation of the outer cylinders.

When both the inner cylinders are separated, since the pressing on the inlet side valve body of the inlet side connector by the second presser part provided inside the inner cylinder of the supply side connector is released, the inlet side valve body is pushed back into the shut off position by the second biasing member, and the supply valve of the supply side connector being supplied is closed. As a result, the supply line inside the inlet side connector is shut off, and the supply of fluid from the fluid supply apparatus to the object of supply is stopped.

Also, with both the inner cylinders separated in this manner, since the pressing on the vent side valve body of the inlet side connector by the third presser part provided on the outer cylinder of the supply side connector is released, the vent side valve body is pushed back into the shut off position by the third biasing member, and the vent valve is closed. As a result, the vent line of the inlet side connector is closed, and the return of fluid from the object of supply to the fluid supply apparatus is stopped.

Here, in the interval until both the outer cylinders are drawn further apart and become completely separated, flushing of the connection sites of both the inner cylinders, the connection sites of both the outer cylinders, and the supply line of the supply side connector is carried out with fluid supplied from the supply line of the supply side connector.

Then, with both the outer cylinders in a state of being completely separated, since the pressing on the supply side valve body of the supply side connector by the first presser part provided inside the inner cylinder of the inlet side connector is released, the supply side valve body is pushed back into the shut off position by the first biasing member, the supply valve of the supply side connector is closed, and flushing and separation of the supply side connector and the inlet side connector is completed.

Moreover, in a connector constructed in this manner, since the opening of the supply line of the inlet side connector is carried out after flushing the connection sites and the supply line of the supply side connection part has been carried out in the process of coupling of the supply side connector and the inlet side connector, impurities are not likely to be mixed into the fluid supplied to the object of supply.

Also, since the supply line and the vent line of the inlet side connector are shut first at the time of separation of the supply side connector and the inlet side connector, impurities are not likely to be mixed into the supply line and the vent line of the inlet side connector.

In addition, since the supply valve of the supply side connector is shut in a state in which flushing of the connection site is being carried out, impurities are not mixed easily into the supply line of the supply side connector, and impurities are not likely to be mixed into the fluid when the fluid is supplied to the object of supply again.

Moreover, in this connector, since the opening and closing of the supply line and the vent line are carried out automatically in synchrony with the coupling operation and separation operation of the supply side connector and the inlet side connector, it is not necessary for the operator to carry out operations to open and close the supply line and the vent line, so that the coupling operation and the separation operation are easy, and these operations can be carried out smoothly and expeditiously.

Here, this connector may be of a construction in which a purge gas that is other than the fluid supplied to the object of supply is supplied to the supply line of the supply side connector on flushing, and flushing is carried out by this purge gas.

Moreover, this connector may be such that the inlet side valve body of the inlet side connector constitutes the first presser part, the supply side valve body of the supply side connector constitutes the second presser part, an end connection of the outer cylinder of the supply side connector constitutes the third presser part, and a biasing force of the second biasing member is greater than that of the first biasing member, so that from when the supply side valve body and the inlet side valve body make contact until both the inner cylinders are connected, only the supply side valve body is moved to the upstream side from the shut off position, and the inlet side valve body is held in the shut off position.

In the connector constructed in this manner, since the supply side valve body, the inlet side valve body, and the connection end of the outer cylinder of the supply side connector double as the presser parts that operate the respective valve bodies, the number of parts for the connector may be few, and because the construction can be simplified, production cost can be reduced and maintenance is also easy.

Moreover, in the connector, the construction may be such that a cylindrical cover is provided on at least one of the supply side connector and the inlet side connector, that encloses the connection ends of both the outer cylinders in a state in which the outer cylinder of the one connector and the outer cylinder of the other connector are in a state of opposition and are in proximity, and the cover has a purge gas supply apparatus that supplies purge gas into the cover, connected thereto.

In a connector constructed in this manner, in a state in which the outer cylinder of the supply side connector and the outer cylinder of the inlet side connector are in a state of opposition and are in proximity, the circumference of the connection ends of both the outer cylinders are covered by the cover. That is to say, at the time of coupling of the supply side connector and the inlet side connector, the circumference of the connection ends of both the outer cylinders are covered by the cover before the connection of both the outer cylinders takes place. Also, at the time of separation of the supply side connector and the inlet side connector, the circumference of the connection ends of both the outer cylinders are covered by the cover during the interval from immediately after both the outer cylinders have separated until the supply side connector and the inlet side connector are drawn apart.

Moreover, since purging of the connection site of the supply side connector and the inlet side connector is carried out with purge gas being supplied from the purge gas supply apparatus into the cover on coupling and on separation of the supply side connector and the inlet side connector, impurities are not likely to be mixed into the fluid supplied to the object of supply.

In addition, since the purge gas used for this purging is returned to the fluid supply apparatus through the vent line of the supply side connector, the purge gas can be recovered, and the cost required for purging can be decreased.

Also, in this connector the construction may be such that the cover doubles as a locking device that puts the connection locations of the supply side connector and the inlet side connector into a state of opposition and determines and fixes the position thereof, and a movement device that draws together and moves apart the supply side connector and the inlet side connector is provided on this cover.

In a connector constructed in this manner, in a state in which the position of supply side connector and the inlet side connector has been determined and fixed by the cover at the time of the coupling operation of the supply side connector and the inlet side connector, by operating the movement device and bringing the supply side connector and the inlet side connector together, the rest of the coupling operation is carried out automatically. Similarly, in this connector, by operating the movement device and distancing the supply side connector and the inlet side connector that are in a coupled state, the rest of the separation operation can be automatically carried out. Therefore, in this connector, the coupling operation and the separation operation are easy, and these operations can be carried out smoothly and expeditiously.

In addition, in this connector, in the case in which the opening and closing of the supply line and the vent line are carried out automatically in synchrony with the coupling operation and the separation operation of the supply side connector and the inlet side connector, since the supply and termination of the supply of fluid to the object of supply can be carried out automatically simply by carrying out the operation of the movement device after the position determination and fixing of the supply side connector and the inlet side connector by the cover, the coupling operation and the separation operation are easy, and these operations can be carried out smoothly and expeditiously.

Also, in this connector the construction may be such that a part in the axial direction of at least one of the inner cylinder and the outer cylinder of the supply side connector, and the inner cylinder and the outer cylinder of the inlet side connector is constructed by a bellows.

In a connector constructed in this manner, since the outer cylinder (or inner cylinder), with a part constructed by a bellows, is pressed against the other outer cylinder (or the other inner cylinder) by the elastic force in the bellows part when it touches the other outer cylinder (or the other inner cylinder), the degree of adhesion of the outer cylinder (or inner cylinder) is high.

Therefore, leakage of the fluid from the connection part of the outer cylinders (or connection parts of the inner cylinders) is unlikely to occur in this connector, and especially in the case in which a cryogenic fluid such as liquefied hydrogen or the like is being handled, the reliability of such a connector is high in the case of use in applications in which heat shrinkage may occur in the outer cylinders or inner cylinders.

The supply side connector according to the present invention is provided on a fluid-supply apparatus and, together with an inlet side connector provided on an object of supply of a fluid, comprises a connector to the object of supply of, a supply line that is used for the supply of the fluid from the fluid supply apparatus to the object of supply, and a vent line that is used for the return of fluid from the object of supply to the fluid supply apparatus, and constitutes the supply line and the vent line in the connector, and comprises: a supply valve provided on the supply line, that carries out restriction and allowance of the flow of the fluid through the supply line; a valve opening and closing apparatus that operates opening and closing of the supply valve; an inner cylinder that constitutes the connector of the supply line with the supply line of the inlet side connector; and an outer cylinder that encloses the inner cylinder and that constitutes a connection part of the vent line and the vent line of the inlet side connector, the supply valve being provided inside the inner cylinder and being of a construction in which switching between restriction and release of the flow of the fluid through the supply line is carried out by changing position in the axial direction of the inner cylinder, and the valve opening and closing apparatus being of a construction such as to control the opening and closing of the supply valve by moving it in the axial direction.

In a supply side connector constructed in this manner, a part of the supply line and the vent line is constructed by the inner cylinder and the outer cylinder, and the supply line and the vent line are a dual pipe construction. Therefore, this supply side connector can be achieved in a smaller size than the case in which the supply line and the vent line are respectively constructed by separate piping.

Also, in this supply side connector, the inner cylinder constitutes the supply line, and the outer cylinder and the inner cylinder constitute the vent line, and they are of a construction in which the circumference of the supply line is enclosed by the vent line. Therefore, in the case of supplying a liquid having a large difference in temperature from the surrounding atmosphere, the vent line and the fluid inside the vent line act as a heat insulation layer, and hence the supply side connector can be achieved without the provision of a large scale heat insulation construction.

Moreover, the supply valve is provided in the inner cylinder in this supply side connector, and this supply valve is of a construction such that the change between restriction and allowance of the flow of the fluid can be carried out by displacing in the axial direction of the inner cylinder.

Thus, since the valve is housed within a dual pipe construction in this supply side connector, the size of the connector can be kept to a minimum.

In the fluid supply apparatus according to the present invention, the above supply side connector is used as a connector for connecting a supply line used in the supply of fluid, and a vent line used in the return of the fluid, to the object of supply of a fluid.

Since the fluid supply apparatus constructed in this manner uses a small, light connector as the connector, handling is easy and the coupling operation and the separation operation of the fluid supply apparatus and the object of supply can be carried out smoothly and expeditiously.

This fluid supply apparatus may have a casing in which the supply side connector is housed, and a purge gas supply apparatus that supplies purge gas inside the casing.

In the fluid supply apparatus constructed in this manner, the supply side connector is housed in the casing and by supplying purge gas into the casing from the purge gas supply apparatus in this state, purging of the site of connection with the inlet side connector of the supply side connector is carried out.

Therefore, in a state in which this fluid supply apparatus is not being used in the supply of fluid, by housing the supply side connector in the casing and carrying out purging, the supply side connector can be kept in a clean condition.

Here, by using a sufficiently high temperature dry gas as the purge gas, condensation occurring in the supply side connector in the case in which it has been used in the supply of cryogenic liquid, can be removed quickly and the next fluid supply operation can begin soon afterwards.

Furthermore, the purge gas supplied inside the casing can be recovered to the fluid supply apparatus through the vent line of the supply side connector.

Moreover, this fluid supply apparatus may be such that, a discharge opening through which the purge gas supplied from the purge gas supply apparatus is discharged, is provided at a position in the casing opposed to a connection site of the supply side connector with the inlet side connector, and a diffuser that diffuses the purge gas discharged from the discharge opening is provided at this discharge opening.

In a fluid supply apparatus having such a construction, the connection sites can be contacted by the purge gas without bias since the purge gas discharged from the discharge opening is supplied to the connection sites of the supply side connector after being diffused by the diffuser. Hence the purging becomes certain and highly efficient.

Here, for example a plate shaped diffuser in which a plurality of vent holes are formed, may be used as the diffuser.

The inlet side connector according to the present invention is provided on an object of supply of fluid and, together with a supply side connector provided on a fluid supply apparatus, comprises a connector to the object of supply of, a supply line that is used for the supply of the fluid from the fluid supply apparatus to the object of supply, and a vent line that is used for the return of fluid from the object of supply to the fluid supply apparatus, and constitutes the supply line and the vent line in the connector, and comprises: a supply valve provided on the supply line that carries out restriction and allowance of the flow of the fluid through the supply line; a vent valve provided on the vent line that carries out restriction and allowance of the flow of the fluid through the vent line; a valve opening and closing apparatus that operates opening and closing of the supply valve and the vent valve; an inner cylinder that constitutes the connection part of the supply line with the supply line of the supply side connector; and an outer cylinder that encloses the inner cylinder and that constitutes a connection part of the vent line and the vent line of the supply side connector, the supply valve being provided inside the inner cylinder and being of a construction in which switching between restriction and release of the flow of the fluid through the supply line is carried out by changing position in the axial direction of the inner cylinder, and the vent valve being provided between the outer cylinder and the inner cylinder and being of a construction in which switching between restriction and release of the flow of the fluid through the vent line is carried out by changing the position in the axial direction, and the valve opening and closing apparatus being of a construction such as to control the opening and closing of the supply valve and the vent valve by respectively moving them in the axial direction.

In an inlet side connector constructed in this manner, a part of the supply line and the vent line is constructed by the inner cylinder and the outer cylinder, and the supply line and the vent line are a dual pipe construction. Therefore, this inlet side connector can be achieved in a smaller size than the case in which the supply line and the vent line are respectively constructed by separate piping.

Also, in this inlet side connector, the inner cylinder constitutes the supply line, and the outer cylinder and the inner cylinder constitute the vent line, and they are of a construction in which the circumference of the supply line is enclosed by the vent line. Therefore, in the case of supplying a liquid having a large difference in temperature from the surrounding atmosphere, the vent line and the fluid inside the vent line act as a heat insulation layer, and hence the inlet side connector can be achieved without the provision of a large scale heat insulation construction.

Moreover, the supply valve is provided in the inner cylinder in this inlet side connector, the vent valve is provided in the outer cylinder, and these supply valve and vent valve are of a construction such that the change between restriction and allowance of the flow of the fluid can be carried out by respectively displacing them in the axial direction of the inner cylinder.

Thus, since all of the valves are housed within a dual pipe construction in this inlet side connector, the size of the connector can be kept to a minimum.

The movable body according to the present invention is a movable body of a construction having a fuel tank that stores a liquid that serves as fuel for a power generation apparatus, wherein the fuel is supplied from a fuel supply apparatus to the fuel tank through a supply line, and liquid inside the fuel tank is returned to the fuel supply apparatus through a vent line, and the above inlet side connector is used as a connector for connecting the supply line and the vent line to the fuel tank.

Since the movable body constructed in this manner employs a small, lightweight connector as the connector, the spatial restrictions and weight restrictions of providing the connector are few, and hence the degree of freedom of design is high.

Also, since the connector is small and lightweight, restrictions on the position of provision of the connector on the movable body are few, and since the connector can be disposed in a position better suited to the connection operation with the fuel supply apparatus, the connection operation with the fuel supply apparatus becomes easy.

The fluid supply system according to the present invention is of a construction such that a supply line used in the supply of fluid from a fluid supply apparatus to an object of supply, and a vent line used in the return of fluid from the object of supply to the fluid supply apparatus are connected to the object of supply using the above connector.

In the fluid supply system constructed in this manner, since a small, light connector is used as the connector, handling is easy and the coupling operation and the separation operation of the fluid supply apparatus and the object of supply can be carried out smoothly and expeditiously.

The connector connection method according to the present invention is a connector connection method for connecting a fluid supply apparatus and an object of supply using the above connector, wherein the supply valve and the vent valve are closed in a state in which the supply side connector and the inlet side connector are separated, and the connection of both the outer cylinders is carried out before the connection of both the inner cylinders, and the supply valve of the supply side connector is opened in this state so that flushing of the connection part of both the inner cylinders, the connection part of both the outer cylinders, and the vent line of the supply side connector is carried out by the fluid supplied from the supply line of the supply side connector, and after both the inner cylinders are connected, the supply valve of the supply side connector is opened and supply of fluid from the fluid supply apparatus to the object of supply begins, and the vent valve is opened and return of fluid from the object of supply to the fluid supply apparatus is carried out.

In this connector connection method, since the opening of the supply line and the vent line of the inlet side connector is carried out after flushing the connection sites and the supply line of the supply side connector has been carried out in the process of coupling of the supply side connector and the inlet side connector, impurities are not likely to be mixed into the fluid supplied to the object of supply.

Here, the fluid used for flushing can be returned to the fluid supply apparatus through the vent line of the supply side connector.

Furthermore, the fluid used for flushing may be a purge gas that may be other than the fluid supplied to the object of supply.

The connector separation method according to the present invention is a connector separation method for separating a fluid supply apparatus and an object of supply that are connected using the above connector, wherein the supply valve of the supply side connector and the vent valve are closed before the separation of both the outer cylinders, and the supply line and the vent line of the inlet side connector are closed, and both the inner cylinders are separated and flushing of a connection part of both the inner cylinders, a connection part of both the outer cylinders, and the vent line of the supply side connector is carried out by the fluid supplied from the supply line of the supply side connector, and both the outer cylinders are separated after the supply valve of the supply side connector is closed and the supply of the fluid from the supply line of the supply side connector has stopped.

Also, in this connector separation method, since the supply line and the vent line of the inlet side connector are closed before separation of the supply side connector and the inlet side connector, impurities are not likely to be mixed into the supply line and the vent line of the inlet side connector.

In addition, since the supply valve is closed while flushing of the connection site is being carried out, impurities are not likely to mix into the supply line of the supply side connector, and impurities are not likely to be mixed into the fluid when the fluid is supplied to the object of supply again.

Furthermore, the fluid used for flushing may be a purge gas that may be other than the fluid supplied to the object of supply.

According to the connector according to the present invention, a part of the supply line and the vent line is constructed by the inner cylinder and the outer cylinder, and the supply line and the vent line are a dual pipe construction inside the connector. Therefore, this connector can be achieved in a smaller size than the case in which the supply line and the vent line are respectively constructed by separate piping. Moreover, this connector is especially suitable for the handling of liquids of extremely low temperature.

According to the connector according to the present invention, since a small, light connector is used, handling is easy and the coupling operation and the separation operation of the fluid supply apparatus and the object of supply can be carried out smoothly and expeditiously.

According to the movable body according to the present invention, a small, lightweight connector is employed as the connector, and since the spatial restrictions and weight restrictions of providing the connector are few, the degree of freedom of design is high.

Also, since the connector is small and lightweight, restrictions on the position of provision of the connector on the movable body are few, and since the connector can be disposed in a position better suited to the connection operation with the fuel supply apparatus, the connection operation with the fuel supply apparatus becomes easy.

According to the fluid supply system according to the present invention, since a small, light connector that is furthermore suited to the handling of cryogenic liquids is used as the connector, handling is easy, and the coupling operation and the separation operation of the fluid supply apparatus and the object of supply can be carried out smoothly and expeditiously.

Therefore, when the fluid that the fluid supply apparatus supplies is for instance liquefied hydrogen of an extremely low temperature, the supply operation of liquefied hydrogen can be carried out in a mode substantially similar to the fuel supply mode in a conventional gas station.

According to the connector connection method according to the present invention, since the opening of the supply line and the vent line of the inlet side connector is carried out after flushing the connection sites and the supply line of the supply side connector has been carried out in the process of coupling of the supply side connector and the inlet side connector, impurities are not likely to be mixed into the fluid supplied to the object of supply.

According to the connector separation method according to the present invention, since the supply line and the vent line of the inlet side connector are closed before separation of the supply side connector and the inlet side connector, impurities are not mixed easily with the supply line and the vent line of the inlet side connector.

In addition, since the supply valve of the supply side connector is closed while flushing of the connection site is being carried out, impurities are not likely to mix into the supply line of the supply side connector, and impurities are not likely to be mixed into the fluid when the fluid is supplied to the object of supply again.

BRIEF DESCRIPTION OF THE DRAWINGS

FIG. 9 is a diagram showing the shape of a diffuser used for the fuel supply apparatus shown in FIG. 8.

DETAILED DESCRIPTION OF THE INVENTION

Hereunder, an embodiment according to the present invention is described, with reference to drawings.

A fluid supply system according to the present invention is for respectively connecting to an object of supply, a supply line that is used for the supply of fluid from a fluid supply apparatus to the object of supply, and a vent line that is used for the return of fluid from the object of supply to the fluid supply apparatus. In the present embodiment, an example is shown in which the fluid supply system according to the present invention is applied to a fuel supply system 1 that connects a fuel supply apparatus that supplies liquefied hydrogen, which is a cryogenic fluid, with a fuel tank of a movable body that uses hydrogen as a fuel.

Here, as such a movable body there is for example a hydrogen fueled vehicle that burns hydrogen in its engine and generates power, or a fuel cell powered vehicle that converts hydrogen into electric power using a fuel cell, and has a motor as a power source.

Figure 1:
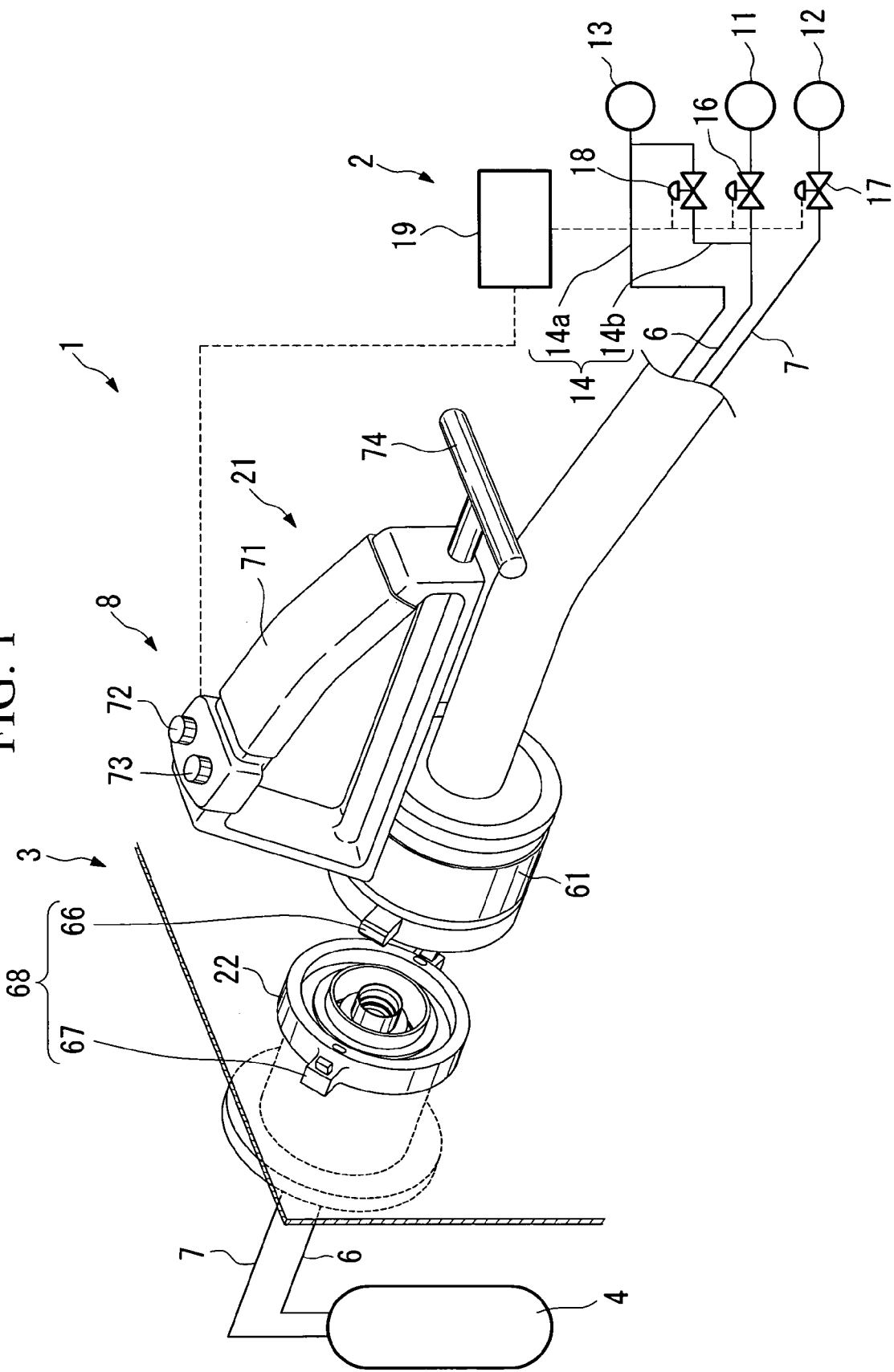
FIG. 1 is a schematic configuration diagram of a fuel supply system, being one embodiment of the present invention.

As shown in the schematic diagram of FIG. 1, the fuel supply system 1 includes a supply line 6 that connects a fuel supply apparatus 2 with a fuel tank 4 of a moveable body 3 and that is used for the supply of liquefied hydrogen from the fuel supply apparatus 2 to the fuel tank 4, and a vent line 7 that is used to return fluid inside the fuel tank 4 (for instance, gaseous hydrogen or the like) to the fuel supply apparatus 2.

The supply line 6 and vent line 7 are divided into each of a fuel supply apparatus 2 side and a fuel tank 4 side, and both of these divided lines are detachably connected by a connector 8. Moreover, the conduit that constructs the supply line 6 and the conduit that constructs the vent line 7 constitute a dual pipe construction. Specifically, the pipe that constructs the supply line 6 is passed through the inside of the pipe that constructs the vent line 7.

The fuel supply apparatus 2 has a liquefied hydrogen supply source 11 that supplies liquefied hydrogen to the supply line 6, and a fluid recovery apparatus 12 that recovers fluid returned through the vent line 7.

Also, a purge gas supply apparatus 13 that supplies purge gas used for purging of the connector 8 is provided in the fuel supply apparatus 2. This purge gas supply apparatus 13 is connected to the connector 8 through a purge gas line 14.

Here, for instance, an inert gas such as helium gas is used as a purge gas. Also, the temperature of the purge gas is preferably the same level as room temperature, or higher.

A first supply valve 16 that restricts the flow of fluid in the supply line 6 is provided on the supply line 6 in the region on the liquefied hydrogen supply source 11 side of the connector 8.

Moreover, a first vent valve 17 that restricts the flow of fluid in the vent line 7 is provided on the supply line 7 in the region on the fluid recovery apparatus 12 side of the connector 8.

The purge gas line 14 has a main channel 14a connected to the connector 8 and a branching channel 14b that is connected to the supply line 6 in the region between the connector 8 and the first supply valve 16. A first purge side valve 18 that restricts the flow of fluid through the branching channel 14b is provided on the branching channel 14b.

In the present embodiment, these first supply valve 16, first vent valve 17 and first purge side valve 18 are respectively constituted by automatic valves, and the opening and shutting operations thereof are controlled by a control device 19.

The connector 8 itself comprises a part of the supply line 6 and vent line 7, and has a supply side connector 21 provided on the supply line 6 and the vent line 7 on the fuel supply apparatus 2 side, and an inlet side connector 22, detachably coupled to the supply side connector 21, provided on the movable body 3.

Figure 2:
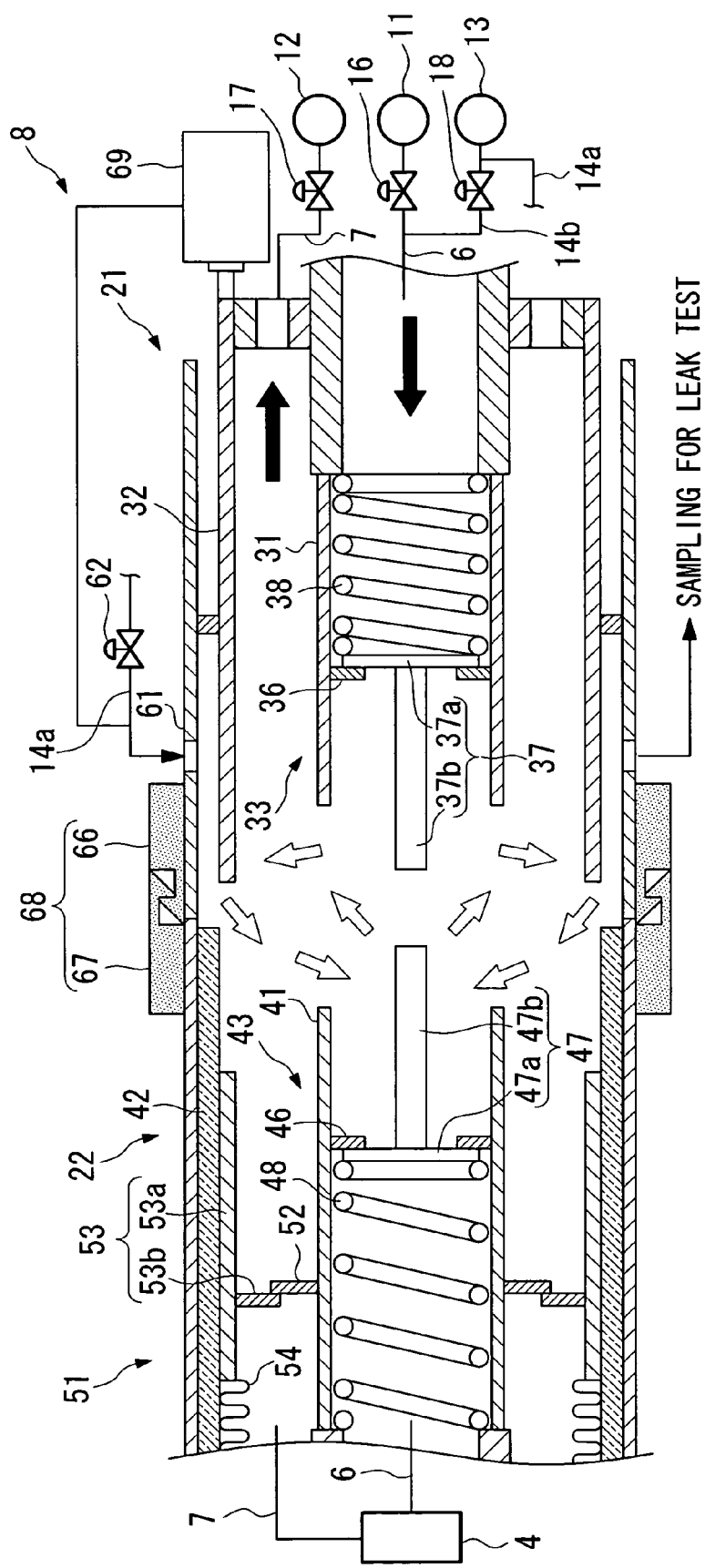
FIG. 2 is a longitudinal section view showing the composition of a connector, being one embodiment of the present invention.

As shown in the longitudinal section drawing of FIG. 2, the supply side connector 21 includes an inner cylinder 31 which constitutes a connection part of both the supply lines 6, and an outer cylinder 32 which encloses the inner cylinder 31 and which constitutes a connection part of both the vent lines 7. Here, the end on a connection part side of the outer cylinder 32 (hereafter, referred to as the connection end) is projected further than the connection end of the inner cylinder 31. Moreover, in the present embodiment, at least the parts close to the connection ends of the inner cylinder 31 and the outer cylinder 32 are respectively cylindrical, and at least in the parts near to their connection ends, the inner cylinder 31 and the outer cylinder 32 are coaxial.

Furthermore, a second supply valve 33 that carries out restriction and allowance of the flow of fluid through the supply line 6, is provided on the supply line 6 that constitutes the supply side connector 21.

The second supply valve 33 is provided inside the inner cylinder 31, and is a construction whereby the change in position in the axial direction of the inner cylinder 31 of a supply side valve body 37 described below carries out switching of restriction and cutting off of the flow of the fluid through the supply line 6.

In the present embodiment, the second supply valve 33 includes a reduced diameter part 36 provided near the connection end of the inner cylinder 31, a supply side valve body 37, a part of which is provided in the supply line 6 upstream of this reduced diameter part 36, and a first biasing member 38 which biases the supply side valve body 37 toward the reduced diameter part 36.

The supply side valve body 37 is a poppet valve that includes a head part 37a provided upstream of the reduced diameter part 36, and a stem part 37b that extends from the head part 37a to the connection end side (the downstream side of the supply line 6). It shuts off the supply line 6 in a state in which it is pressed against the reduced diameter part 36 by the biasing force of the first biasing member 38 (hereafter this supply side valve body 37 is taken as being in the shut off position), and by pushing it back to the upstream side and separating it from the reduced diameter part 36 by overcoming the biasing force of the first biasing member 38 by an external force or the like, the supply line 6 is configured to be open.

Furthermore, when the supply side valve body 37 is in the shut off position, the stem part 37b is projected further out than the connection end of the inner cylinder 31.

On the other hand, the inlet side connector 22 has an inner cylinder 41 which constitutes a connection part of both the supply lines 6, and an outer cylinder 42 which encloses the inner cylinder 41 and which constitutes a connection part of both the vent lines 7.

Here, the connection end of the outer cylinder 42 is projected further out than the connection end of the inner cylinder 41. Moreover, in the present embodiment, at least the parts close to the connection ends of the inner cylinder 41 and outer cylinder 42 are respectively cylindrical, and at least in the parts near to their connection ends, the inner cylinder 41 and the outer cylinder 42 are coaxial.

The internal diameter of the outer cylinder 42 in at least the part near the connection end is greater than the external diameter of at least the part near the connection end of the outer cylinder 32 of the supply side connector 21, and they are constructed so that the connection end of the outer cylinder 32 is inserted into the connection end of the outer cylinder 42 in the process of joining the supply side connector 21 to the inlet side connector 22. Moreover, the connection end of the outer cylinder 32 is inserted a predetermined amount into the connection end of the outer cylinder 42, so that the connection end of the inner cylinder 31 and the connection end of the inner cylinder 41 contact and are connected.

Here, the connection parts of the outer cylinder 32 and the outer cylinder 42 are provided with a sealing structure that seals between the connection parts with respect to gas and liquid when they are connected. Similarly, the connection parts of the inner cylinder 31 and the inner 41 are provided with a sealing structure that seals between the connection parts with respect to gas and liquid when they are connected.

Furthermore, a third supply valve 43 that carries out restriction and allowance of the flow of fluid through the supply line 6, is provided on the supply line 6 that constitutes the inlet side connector 22.

The third supply valve 43 is provided inside the inner cylinder 41, and is a construction whereby the change in position in the axial direction of the inner cylinder 41 of an inlet side valve body 47 described below carries out switching of restriction and release of the flow of the fluid through supply line 6.

In the present embodiment the third supply valve 43 includes a reduced diameter part 46 provided near the connection end of the inner cylinder 41, an inlet side valve body 47, a part of which is provided in the supply line 6 downstream of this reduced diameter part 46, and a second biasing member 48 which biases this inlet side valve body 47 toward the reduced diameter part 46 (specifically towards the upstream side of the supply line 6).

The inlet side valve 47 is a poppet valve that includes a head part 47a provided downstream of the reduced diameter part 46, and a stem part 47b that extends from the head part 47a to the connection end side (the upstream side of the supply line 6). It shuts off the supply line 6 in a state in which it is pressed against the reduced diameter part 46 by the biasing force of the second biasing member 48 (hereafter this supply side valve body 47 is taken as being in the shut off position), and by pushing it back to the downstream side and separating it from the reduced diameter part 46 by overcoming the biasing force of the second biasing member 48 by an external force or the like, the supply line 6 is configured to be open.

Furthermore, when the inlet side valve body 47 is in the shut off position, the stem part 47b is projected further out than the connection end of the inner cylinder 41. The tip of this stem part 47b and the stem part 37b contact with each other in the process in which the inner cylinder 31 of the supply side connector 21 and the inner cylinder 41 of the inlet side connector 22 connect.

That is to say, in a state in which the outer cylinder 32 of the supply side connector 21 is inserted into the outer cylinder 42 of the inlet side connector 22, the stem part 47b of the inlet side valve body 47 of the inlet side connector 21 constitutes a first presser part that contacts with the stem part 37b of the supply side valve body 37 and moves it to the upstream side of the shut off position in the supply line 6.

On the other hand, in a state in which the inner cylinder 31 and the inner cylinder 41 are connected, the stem part 37b of the supply side valve body 37 of the supply side connector 21 constitutes a second presser part that contacts the stem part 47b of the inlet side valve body 47, and moves it downstream of the shut off position in the supply line 6.

That is to say, the supply side valve body 37 and the inlet side valve body 47 constitute a valve opening and closing apparatus that operates opening and closing by moving the supply side valve body 37 of the first supply valve 33 and the inlet side valve body 47 of the second supply valve 43 respectively in the axial direction.

Here, the biasing force of the second biasing member 48, which biases the inlet side valve body 47, is set to be greater than that of the first biasing member 38, which biases the supply side valve body 37. As a result, from the point at which the supply side valve body 37 and the inlet side valve body 47 make contact, until the inner cylinders 31 and 41 make contact, only the supply side valve body 37 is moved from the shut off position to the upstream side, and the inlet side valve body 47 is kept in the shut off position.

Furthermore, on the inlet side connector 22, a second vent valve 51 that carries out restriction and allowance of the flow of fluid through this vent line 7 is provided on the vent line 7.

The second vent valve 51 is of a construction such that the change of restriction and release of the flow of fluid through the vent line 7 is carried out by changing the position along the axial direction of the inner cylinder 41 and the outer cylinder 42, of a vent side valve body 53 described hereafter that is provided between the outer cylinder 42 and the inner cylinder 41.

In the present embodiment, the second vent valve 51 has a flange 52 provided in a state of projecting radially outwards around the entire outer perimeter of the inner cylinder 41, a vent side valve body 53 that is in a state where a part is positioned on the upstream side of the flange 52 on the vent line 7, and that can move along the axial direction of the outer cylinder 42, and a third biasing member 54 that biases this vent side valve body 53 towards the flange 52 (specifically towards the downstream side of the vent line 7).

The vent side valve body 53 has a cylindrical part 53a provided near the connection end of the outer cylinder 42 in a substantially sealed state on the inner face of the outer cylinder 42, and an inner flange 53b provided on the upstream side of the flange 52 on the vent line 7 in the cylindrical part 53a.

A part of the cylindrical part 53a is provided positioned further toward the connection end side than the flange 52.

Also, at least a part from within the region of the cylindrical part 53a positioned on the upstream side of the inner flange 53b on the vent line 7 is constructed by a bellows, and the upstream side end thereof on the vent line 7 is fitted so as to be sealed with the inner face of the outer cylinder 42 against gas and fluid around the entire perimeter.

By its elastic force, this bellows part constitutes the third biasing member 54, which presses the inner flange 53b toward the flange 52.

That is to say, the vent side valve body 53 is of a construction such that the vent line 7 is shut off in the state in which the inner flange 53b is pressed against the flange 52 by the biasing force of the third biasing member 54 (hereunder this vent side valve body 53 is taken as being in the shut off position), and the vent line 7 is opened by overcoming the biasing force of the third biasing member 54 by means of external force or the like, so that, being pushed to the upstream side, the inner flange 53b separates from the flange 52.

Also, in a state in which the outer cylinder 32 of the supply side connector 21 is inserted into the outer cylinder 42 of the inlet side connector 22, and the inner cylinders 31 and 41 are contacted, the cylindrical part 53a contacts with the end of the outer cylinder 32 and is pushed from the shut off position to the upstream side of the vent line 7.

That is to say, the end of the outer cylinder 32 of the supply side connector 21 constitutes a third presser part (valve opening and closing apparatus) that contacts the vent side valve body 53 and moves it from the shut off position to the upstream side of the vent line 7.

Also, a cylindrical cover 61 that encloses the connection ends of the outer cylinder 32 and the outer cylinder 42 in a state where the outer cylinder 32 and the outer cylinder 42 of the inlet side connector 22 are opposing to each other and are disposed adjacent, is provided on the supply side connector 21.

The main channel 14a of the purge gas line 14 is connected to this cover 61, and purge gas is supplied into the cover 61 from the purge gas supply source 13. Here, a second purge valve 62 is provided on the main channel 14a, and supply and supply stop of purge gas into the cover 61 can be carried out by opening and shutting this second purge valve 62. In the present embodiment, this second purge valve 62 is also an automatic valve, the opening and shutting operation of which is controlled by the control device 19.

Also, a first engagement part 66 is provided on the cover 61, and a second engagement part 67 that engages with the first engagement part 66 is provided on the inlet side connector 22. These first engagement part 66 and second engagement part 67 are of a construction such that they engage with each other when, in a state of opposing each other, they are pressed together.

The cover 61, the first engagement part 66, and the second engagement part 67 constitute a locking device that sets the supply side connector 21 and inlet side connector 22 in a state in which the connecting regions thereof are opposed to each other, and determines and fixes this position.

Also a movement device 69 that draws together and also separates the supply side connector 21 and the inlet side connector 22 is provided on the cover 61.

The movement device 69 has an actuator that moves the supply side connector 21 relatively to the cover 61 toward the connection end side, and a biasing member (not shown in the diagram) that presses in the direction against the direction of movement of the supply side connector 21 by the actuator.

In the present embodiment, the actuator is supplied with purge gas from the part on the downstream side of the second purge gas valve 62 of the main channel 14a of the purge gas line 14, and uses the pressure of the purge gas supplied by opening the second purge gas valve 62 to move the supply side connector 21.

That is to say, the movement device 69 is of a construction such that the actuator overcomes the biasing force of the biasing members in a state in which the second purge valve 62 is open, and moves the supply side connector 21 toward the connection end side, and the supply side end connection is pushed back to its original position by the biasing members in a state in which the second purge valve 62 is closed.

Moreover, information of the amount of movement of the supply side connector 21 by this moving device 69 is obtained by the control device 19 through sensors and the like.

Here, as shown in FIG. 1, a handle 71 for the operator to hold is provided on the supply side connector 21.

On this handle 71 there are provided a fill begin switch 72 for sending an instruction to begin the fuel supply operation, to the control device 19, and an emergency stop switch 73 for sending an instruction to emergency stop the fuel supply operation, to the control device 19.

Also, there is provided on the handle 71 a disengaging lever 74 for disengaging the first engagement part 66 and the second engagement part 67, and by operating this disengaging lever 74, the joined supply side connector 21 and inlet side connector 22 can be separated.

Figure 3A:
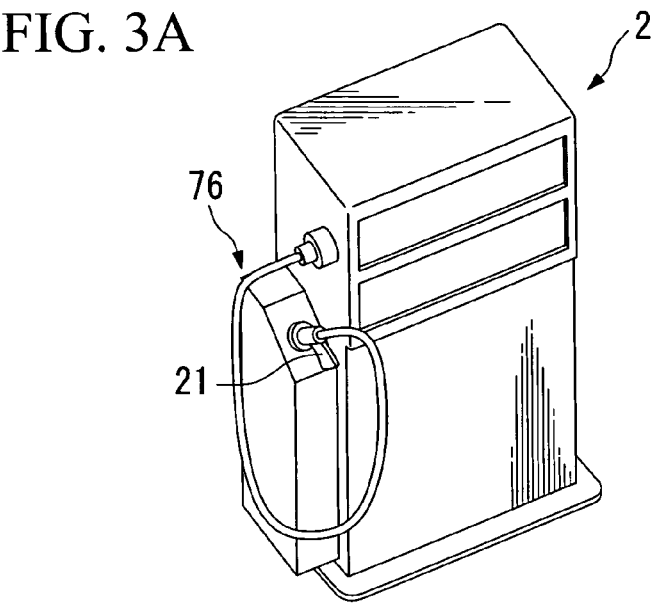
FIG. 3A is a perspective view showing a fuel supply apparatus according to one embodiment of the present invention.

Furthermore, as shown in the perspective view of FIG. 3A, a casing 76, in which the supply side connector is housed, is provided on the fuel supply apparatus 2, and the supply side connector 21 can be housed in this casing 76 in a state in which fuel supply is not being carried out.

Figure 3B:
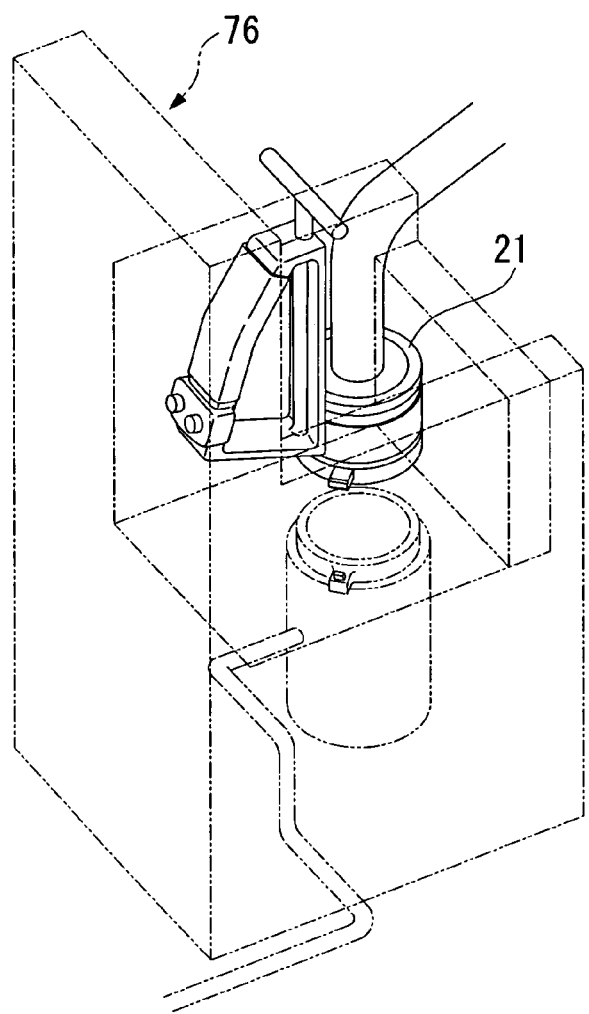
FIG. 3B is a perspective view showing a fuel supply apparatus according to one embodiment of the present invention.
Figure 4A:
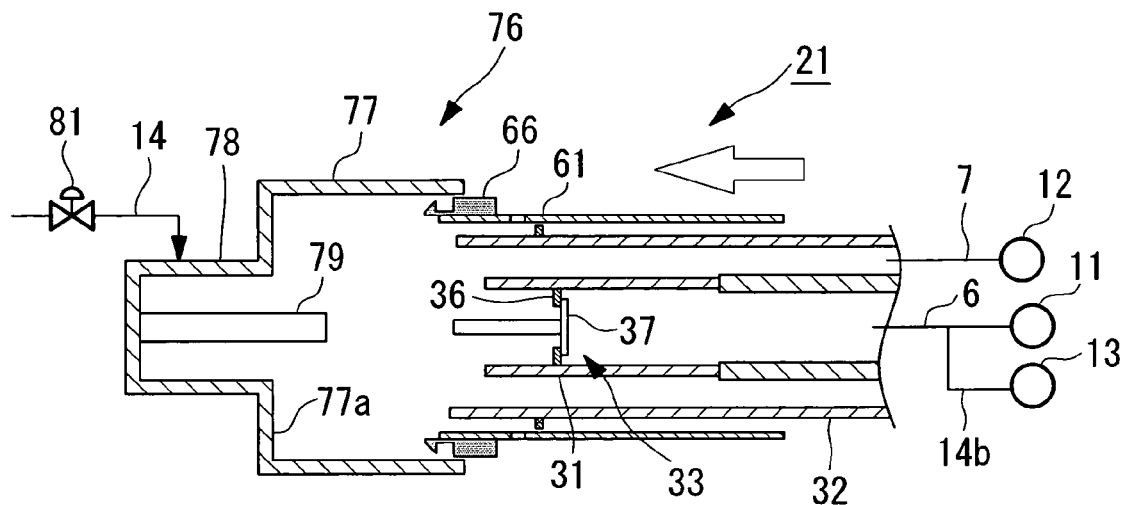
FIG. 4A is a diagram showing the storage status of a supply side connector in the fuel supply apparatus, being one embodiment of the present invention.
Figure 4B:
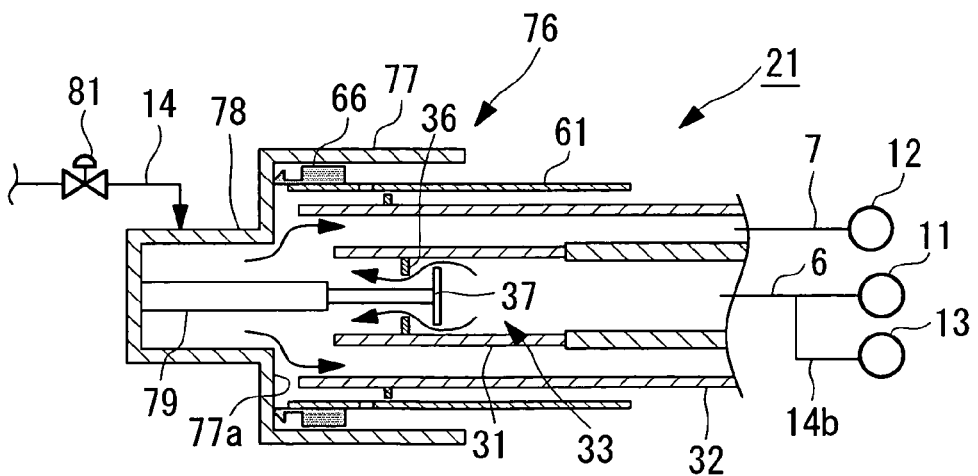
FIG. 4B is a diagram showing the storage status of a supply side connector in the fuel supply apparatus, being one embodiment of the present invention.
Figure 5:
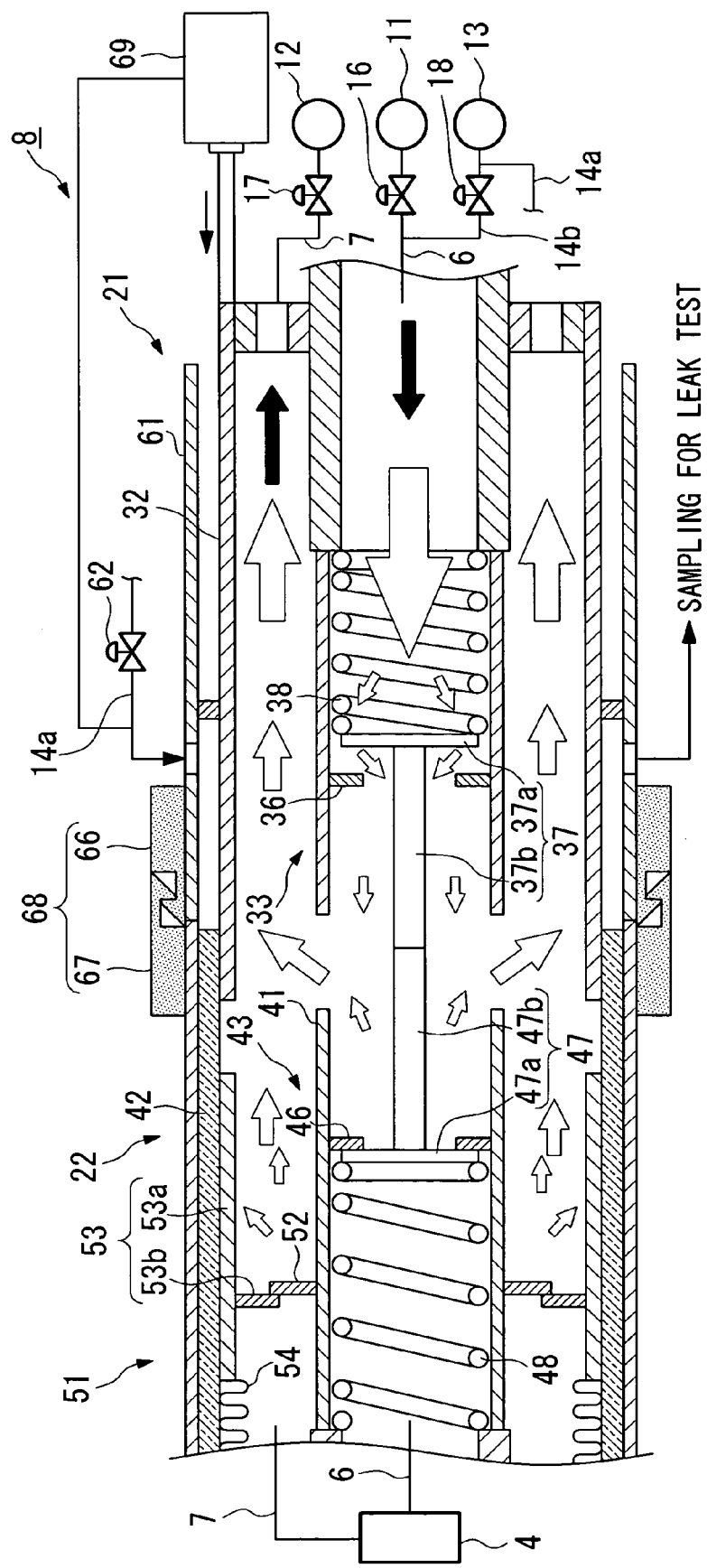
FIG. 5 is a longitudinal sectional view illustrating the operation of the connector, being one embodiment of the present invention.

As is shown in the perspective view of FIG. 3B and the longitudinal sectional view of FIGS. 4A and 4B, the casing 76 houses the supply side connector 21 and the cover 61 in its entirety.

As shown in FIGS. 4A and 4B, the casing 76 has a bottomed cylindrical casing main body 77 and the supply side connector 21 is stored in a state in which the end of the cover 61 is in contact with a bottom part 77a of the casing main body 77.

Furthermore, in the bottom part 77a of the casing main body 77 in the region that opposes the outer cylinder 32 of the supply side connector 21 there is provided a chamber 78 that runs through the casing 77.

In the chamber 78 there is provided a push rod 79, which pushes the supply side valve body 37 and opens the second supply valve 33 in a state in which the supply side connector 21 is stored.

Moreover, the purge gas line 14 is connected to the chamber 78, and purge gas is supplied from the purge gas supply apparatus 13.

Here, a valve 81 is provided on the supply channel of the purge gas to the chamber 78 in the purge gas line 14. Also, in the casing 76 there is provided a detection mechanism (not shown in the diagram), that opens the valve 81 only in the case in which it has detected that the supply side connector 21 is correctly housed in the casing 76, and the supply of purge gas to the inside of the casing 76 is carried out automatically by the operator simply housing the supply side connector 21 in the casing 76.

The procedure of supplying fuel to the fuel tank 4 of the movable body 3, with the fuel supply system 1 constructed in this manner is described below.

Here, the supply side connector 21 is housed in the casing 76 provided on the fuel supply apparatus 2 in a state in which the fuel supply operation is not being carried out (stand-by state).

Moreover, the first supply valve 16 is closed, and the first purge valve 18 is opened, and inside the supply line 6 of the supply side connector 21 is filled with purge gas from the purge gas supply apparatus 13. Moreover, the second purge valve 62 is closed. In the stand-by state, the first vent valve 17 may be either closed or opened.

At the beginning of fuel supply, first, the supply side connector 21 is taken out from the casing 76, and the position thereof is determined and fixed in relation to the inlet side connector 22 provided on the movable body 3, using the locking device 68 provided on the cover 61.

At the time of this position determining and fixing operation the operator needs only to push the supply side connector 21 and the cover 61 in its entirety toward the inlet side connector 22 in a state in which the first engagement part 66 provided on the cover 61 and the second engagement part 67 of the inlet side connector 22 are opposed to each other. By carrying out this operation, the first engagement part 66 and the second engagement part 67 engage and the position determination and fixing of the supply side connector 21 and the inlet side connector 22 is carried out automatically by the locking device 68.

Next, the fill begin switch 72 provided on the handle 71 of the supply side connector 21 is operated, and a fuel supply start signal is sent to the control device 19.

When the control device 19 detects that the fill begin switch 72 has been operated, it opens the second purge valve 62 and the first vent valve 17.

Then, as shown in FIG. 2, purge gas is supplied into the cover 61 through the main channel 14a of the purge line 14, and a purge of each end connection of the supply side connector 21 and the inlet side connector 22 is carried out (purge process).

Here, since the cover 61 encloses the circumference of the outer cylinder 32 of the supply side connector 21 and the outer cylinder 42 of the inlet side connector 22, the purge gas supplied into the cover 61 spreads all over the entire region of the supply side connector 21 and the inlet side connector 22 that has been exposed within the cover 61, and the entirety of these regions is purged with the purge gas. Then, the purge gas used in the purge process is recovered to the fluid recovery device 12 of the fluid supply apparatus 2 through the vent line 7 of the supply side connector 21.

On the other hand, when the second purge valve 62 is opened by shifting to the purge process, purge gas is supplied to the actuator of the movement device 69.

As a result, the actuator overcomes the biasing force of the biasing member of the movement device 69 and moves the supply side connector 21 toward the inlet side connector 22 and couples it with the inlet side connector 22.

Here, as described later, when the supply side connector 21 and the inlet side connector 22 are coupled, the purge process ends. The speed of movement of the supply side connector 21 due to the movement device 69 is decided depending on the balance of the output force of the actuator and the biasing force of the biasing member. Therefore, the power output of the actuator and the biasing force of the biasing member are set such that the purge time is sufficient.

In this way, the movement of the supply side connector 21 by the movement device 69 is carried out, the connection end of the outer cylinder 32 of the supply side connector 21 is inserted into the connection end of the outer cylinder 42 of the inlet side connector 22, the space inside these outer cylinder 32 and outer cylinder 42 is isolated from the space inside the cover 61, and the purge process is completed.

Here, since the connection end of the outer cylinder 32 of the supply side connector 21 is projected more than the connection end of the inner cylinder 31 of the supply side connector 21, the connection of the outer cylinders 32 and 42 is carried out in the process of engaging the supply side connector 21 and the inlet side connector 22 before the connection of the inner cylinders 31 and 41.

In addition, when the supply side connector 21 moves, the stem part 37b of the supply side valve body 37 that constitutes the second supply valve 33 of the supply side connector 21, contacts with the stem part 47b of the inlet side valve body 47 that constitutes the third supply valve 43 of the inlet side connector 22.

The biasing force of the first biasing member 38 that biases the second supply valve 33 toward the shut off position is set to be weaker than that of the second biasing member 48 that biases the third supply valve 43 toward the shut off position.

Therefore, when the supply side connector 21 moves further from this state, only the second supply valve 33 is pushed from the shut off position, and flow of the fluid through supply line 6 of the supply side connector 21 is allowed.

Then, the purge gas that has been supplied into this supply line 6 is supplied to the space in the outer cylinders 32 and 42 from within the supply line 6, and the purge is continued.

Then, when the supply side connector 21 moves still further and the inner cylinders 31 and 41 contact, the first vent valve 17 is closed by the control device 19, and meanwhile the first supply side valve 16 is opened.

As a result, fuel is supplied from the fuel supply apparatus 2 into the supply line 6 of supply side connector 21.

Here, the controller 19 observes the amount of movement of the supply side connector 21 by the movement device 69, and detects the contact of the inner cylinders 31 and 41 on the basis of this movement amount.

Figure 6:
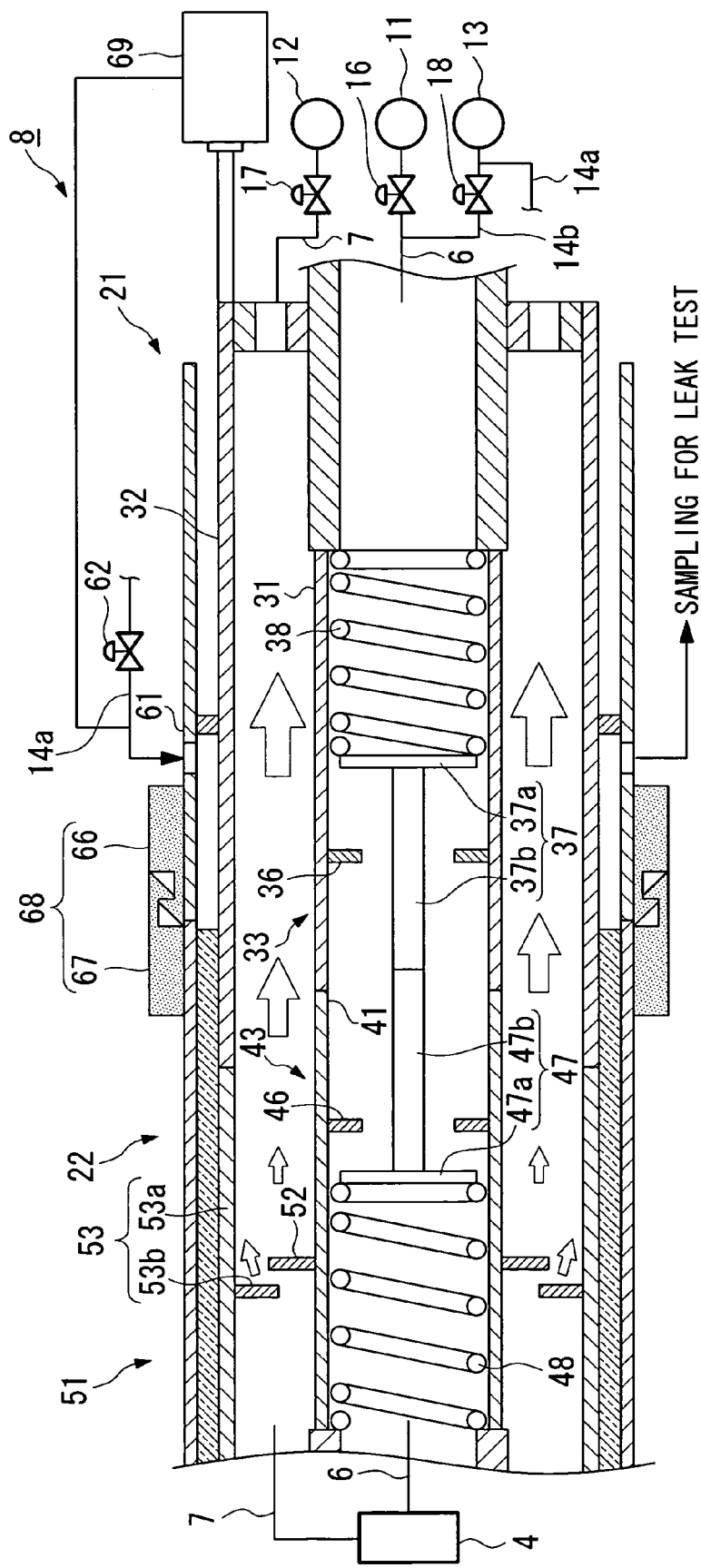
FIG. 6 is a longitudinal sectional view illustrating the operation of the connector, being one embodiment of the present invention.
Figure 7:
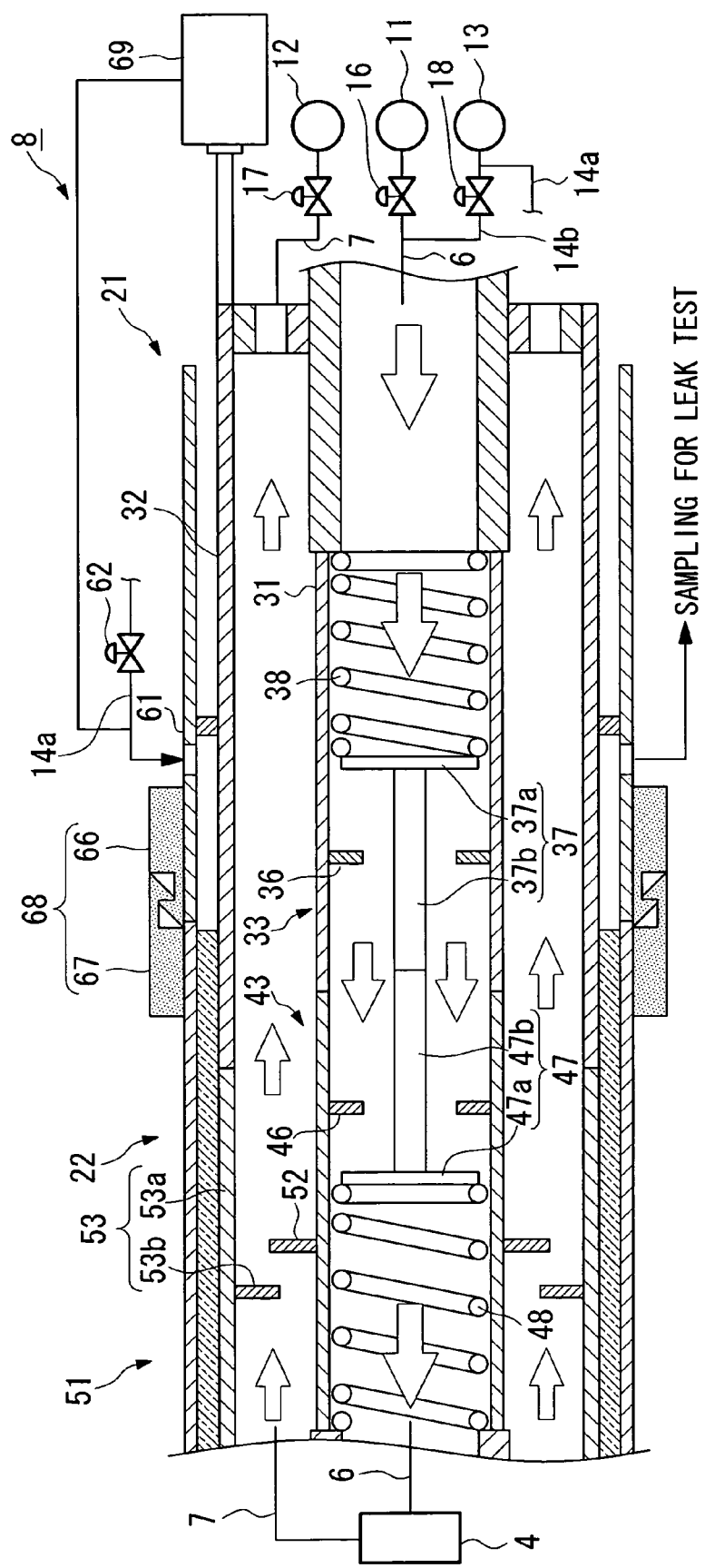
FIG. 7 is a longitudinal sectional view illustrating the operation of the connector, being one embodiment of the present invention.

Moreover, when the inner cylinders 31 and 41 contact in this manner, as shown in FIG. 6 and FIG. 7, the second biasing member 48 that biased the third supply valve 43 of the inlet side connector 22 is also pushed back, and the inlet side valve body 47 is also pushed back from the shut off position, and the flow of fluid through the supply line 6 of the inlet side connector 22 is allowed, and supply of fuel to the fuel tank 4 is carried out.

Here, only gaseous hydrogen of extremely low temperature is supplied by the fuel supply apparatus 2 immediately after the beginning of the fuel supply (liquefied hydrogen that has absorbed the heat of the atmosphere inside the supply line 6 and vaporized may be used as this gaseous hydrogen).

By supplying cryogenic gaseous hydrogen to the supply line 6 at first in this manner, cooling of the supply line 6 and fuel tank 4 is carried out.

Thus, by supplying the liquefied hydrogen after pre-cooling of the supply line 6 and fuel tank 4 has been carried out, the occurrence of boiling and the like of liquefied hydrogen in the supply channel becomes unlikely, and efficient fuel supply can be carried out.

On the other hand, when the inner cylinders 31 and 41 contact in this manner, the vent side valve body 53 of the second vent valve 51 of the inlet side connector 22 is pushed in by the connection end of the outer cylinder 32 of the supply side connector 21, from the shut off position toward to the upstream side, and the flow of fluid through the vent line 7 of the inlet side connector 22 is allowed. Then, the fuel that has vaporized in the fuel tank 4 is pushed out by the fuel supplied from the supply line 6, exhausted to the vent line 7, and it is recovered by the fluid recovery apparatus 12.

As a result, the liquid fuel supplied to the fuel tank 4 quickly replaces the fuel that has vaporized in the fuel tank 4, and supply of liquid fuel to the fuel tank 4 can be carried out expeditiously.

Then, after the fuel tank 4 has been filled with the necessary amount of fuel, the first vent valve 17 is closed and the return of fluid through the vent line 7 to the fuel supply apparatus 2 stopped, and by continuing the supply of gaseous hydrogen from the fuel supply apparatus 2 in this state, the inside of the fuel tank 4 is pressurized to the correct pressure.

Next, the operation of separation of the supply side connector 21 from the inlet side connector 22 is described.

This separation operation is automatically carried out by the control device 19 in the case where the control device 19 judges that the target amount of fuel has finished being filled, or the case where the emergency stop switch 73 is pushed.

In carrying out the separation operation, the control device 19 first closes the second purge valve 62, and the supply of purge gas to the actuator of the movement device 69 is stopped.

As a result, the biasing force of the biasing member of the movement device 69 overcomes the pressing power of the actuator, and the supply side connector 21 is drawn out slowly from the inlet side connector 22.

After that, a process opposite to that for at the time of connection mentioned above is carried out, and the supply side connector 21 and inlet side connector 22 are separated.

Specifically, when the supply side connector 21 begins to draw out from the inlet side connector 22, the separation of the inner cylinders 31 and 41 is carried out before the separation of the outer cylinders 32 and 42.

When the inner cylinders 31 and 41 separate, first the inlet side valve body 47 of the inlet side connector 22 is pushed back to the shut off position by the second biasing member 48, and the third supply valve 43 is closed.

As a result, the supply line 6 of the inlet side connector 22 is shut off, and the supply of fluid from the fuel supply apparatus 2 to the fuel tank 4 is stopped.

In parallel with this, the pressing of the vent side valve body 53 of the inlet side connector 22 by the connection end of the outer cylinder 32 of the supply side connector 21 is released. Therefore the vent side valve body 53 is pushed back to the shut off position by the third biasing member 54, and the second vent valve 51 is closed.

As a result, the vent line 7 of the inlet side connector 22 is closed, and the return of fluid from the fuel tank 4 to the fuel supply apparatus 2 is stopped.

Here, in the interval until the outer cylinders 32 and 42 are drawn further apart and become completely separated, flushing of the connection sites of the inner cylinders 31 and 41, the connection sites of the outer cylinders 32 and 42, and the supply line 6 of the supply side connector 21 is carried out with gaseous hydrogen supplied from the supply line 6 of the supply side connector 21. At this time, the control device 19 opens the first vent valve 17, and restarts the return flow of fluid to the fuel supply apparatus 2 through vent line 7.

In addition, in the present embodiment, after flushing has been carried out for a predetermined time, the first supply valve 16 is closed by the control device 19, and the first purge valve 18 is opened, and purge gas of a temperature greater than or equal to the outside temperature is supplied into the supply line 6 of the supply side connector 21.

As a result, condensation occurring in the supply side connector 21 and the inlet side connector 22 is promptly removed. Moreover, the supply side connector 21 and the inlet side connector 22 are heated to the outside temperature or more than the outside temperature level, and adhesion of condensation after separation is prevented.

Here, since the pressing of the supply side valve body 37 of the supply side connector 21 is released before the outer cylinders 32 and 42 separate completely, the supply side valve body 37 is pushed back to the shut off position by the first biasing member 38, and the second supply valve 33 is closed and flushing is completed.

In a state where the supply side connector 21 is completely pulled away from the inlet side connector 22 in this manner, the supply side connector 21 is completely separated from the inlet side connector 22 by the operator operating the disengaging lever 74 provided on handle 71 of the supply side connector 21, and disengaging the first engagement part 66 and the second engagement part 67 of the locking device 68.

After the supply side connector 21 has been completely separated from the inlet side connector 22 in this manner, it is housed by the operator in the casing 76 provided on the fuel supply apparatus 2 as shown in FIG. 3A, FIG. 3B, FIG. 4A and FIG. 4.

When the supply side connector 21 is stored in the correct position in the casing 76, the supply side valve body 37 is pushed in by the push rod 79 provided in the casing 76 as shown in FIG. 4B, and the second supply valve 33 is opened. As a result, the supply line 56 of the supply side connector 21 is opened, and the purging and the heating of the supply side connector 21 is also carried out inside the casing 76.

Furthermore, since purge gas is supplied to the chamber 78 by the purge gas feeder 12 in the casing 76, the purging and the heating of the supply side connector 21 are also carried out by this purge gas.

As a result, condensation occurring in the supply side connector 21 after the separation of the supply side connector 21 and the inlet side connector 22 is promptly removed, and it becomes possible for the supply side connector 21 to be kept in a clean condition until the next fuel supply operation, and to proceed immediately with the next fuel supply operation.

As mentioned above, the connector 8 used in this fuel supply system 1 is of a construction such that the inner cylinders 31 and 41 constitute the supply line 6, and the outer cylinders 32 and 42 and the inner cylinders 31 and 41 constitute the vent line 7, and the circumference of the supply line 6 is enclosed by the vent line 7. Specifically, the supply line 6 and vent line 7 are of a dual pipe construction in the connector 8.

Therefore, this connector 8 can be achieved in a smaller size than the case in which the supply line 6 and vent line 7 are respectively constructed by separate piping.

Furthermore, with this connector 8, also in the case of supplying liquefied hydrogen, which has a large difference in temperature from the surrounding atmosphere, the vent line 7 and the fluid inside the vent line 7 act as a heat insulation layer, and hence the connector 8 can be achieved without the provision of a large scale heat insulation construction.

Moreover, the second and third supply valves 33 and 43 are provided in the inner cylinders 31 and 41 in this connector 8, the second vent valve 51 is provided in the outer cylinder 42, and these supply valves and vent valve are of a construction such that the change between restriction and allowance of the flow of fluid can be carried out by displacing them in the axial direction of the respective inner cylinders 31 and 41.

Thus, since all the valves are supplied in a dual pipe system in this connector 8, the size of the connector 8 can be kept to a minimum.

Therefore, the fluid supply system 1 according to the present embodiment, which uses such a small and light connector 8, is easily handled, and can carry out the coupling operation and the separation operation of the fuel supply apparatus 12 and the fuel tank 4 smoothly and expeditiously.

In addition, in the connector 8, since the opening and closing of the supply line 6 and vent line 7 are carried out automatically in synchrony with the coupling and separation operation of the supply side connector 21 and the inlet side connector 22, it is not necessary for the operator to carry out operations to open and close the supply line 6 and the vent line 7, so that the coupling operation and separation operation are easy, and these operations can be carried out smoothly and expeditiously.

Moreover, in the connector 8, in a state in which the position of the supply side connector 21 and the inlet side connector 22 has been determined and fixed by the cover 61 at the time of the coupling operation of the supply side connector 21 and the inlet side connector 22, the supply side connector 21 and the inlet side connector 22 are brought close together by the movement device 69, and the rest of the coupling operation is carried out automatically. Similarly, in the connector 8, the separation operation can be automatically carried out by automatically distancing the supply side connector 21 and the inlet side connector 22 that are in a connected state, by the movement device 69. Therefore, in the connector 8, the coupling operation and the separation operation are easy, these operations can be carried out smoothly and expeditiously, and the supply operation of liquefied hydrogen can be carried out in a mode substantially similar to the fuel supply mode in a conventional gas station, despite the fact that the fluid that the fuel system 2 supplies is liquefied hydrogen of an extremely low temperature.

Moreover, in the connector 8, since the opening of the supply line 6 of the inlet side connector 22 is carried out after flushing the connection sites and the supply line 6 of the supply side connector 21 has been carried out in the process of coupling of the supply side connector 21 and the inlet side connector 22, impurities are not likely to be mixed into the fuel supplied to fuel tank 4.

Similarly, since the supply line 6 and the vent line 7 of the inlet side connector 22 are shut first at the time of separation of the supply side connector 21 and the inlet side connector 22, impurities are not mixed easily with the supply line 6 and vent line 7 of inlet side connector 22.

In addition, since the second supply valve 33 is shut in a state in which flushing of the connection site is carried out, impurities are not mixed easily into the supply line 6 of the supply side connector 21, and when fuel is supplied to the fuel tank 4 again, impurities are not mixed easily with the fuel.

Moreover, in the connector 8, at the time of coupling of the supply side connector 21 and the inlet side connector 22, the surroundings of the connection ends of both the outer cylinders 32 and 42 are covered by the cover 61 before the connection of the outer cylinders 32 and 42 takes place. Also, at the time of separation of the supply side connector 21 and the inlet side connector 22, the surroundings of the connection ends of both the outer cylinders 32 and 42 are covered by the cover 61 during the interval from immediately after the outer cylinders 32 and 42 have disengaged until the supply side connector 21 and the inlet side connector 22 are pulled apart.

Furthermore, since the purge gas is supplied by the purge gas feeder 13 in the cover 61 at the time of coupling and separation of the supply side connector 21 and the inlet side connector 22, and purging of the connection site of the supply side connector 21 and the inlet side connector 22 is carried out, impurities are not likely to be mixed into the fuel supplied to the fuel tank 4.

In addition, since the purge gas used for this purging is returned to the fuel supply apparatus 2 through the vent line 7 of the supply side connector 21, the purge gas can be recovered, and the cost required for purging can be decreased.

Also, since the movable body 3 according to the present embodiment employs the small and lightweight connector 8 of the present invention, and the spatial restrictions and weight restrictions of providing the connector 8 are few, the degree of freedom of design is high.

Furthermore, since the connector 8 is small and lightweight in this manner, restrictions on the position of provision of the connector 8 on the movable body 3 are few, and the connector 8 can be disposed in a position more suited to the connection operation with the fuel supply apparatus 12. Therefore the connection operation with the fuel supply apparatus 12 becomes easy.

Figure 8:
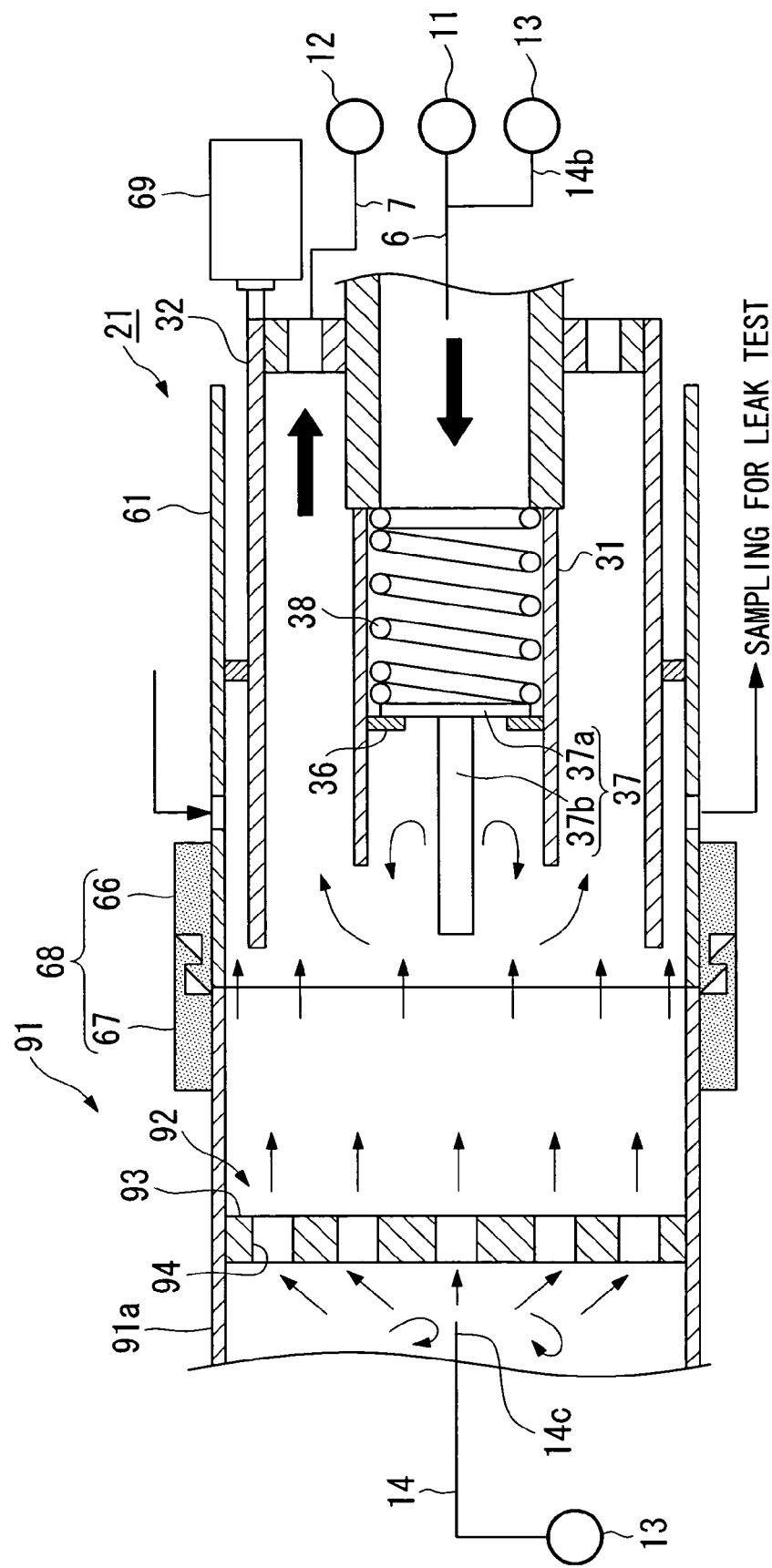
FIG. 8 is a longitudinal sectional view showing another configuration example of a fuel supply apparatus according to the present invention.

Here, in the above described embodiments, an example has been shown where a casing 76 is provided in which the supply side connector 21 and the cover 61 thereof are housed in their entirety. However the invention is not limited to this and a casing 91 as shown in the longitudinal sectional view of FIG. 8 may be provided on the fuel supply apparatus 2 in place of the casing 76.

The casing 91 has a bottomed cylindrical casing main body 91a of substantially the same diameter as the cover 61, and the second connection device 67 is provided on the outer circumference of the open end, and the supply side connector 21 is fixed with the locking device 68.

On the bottom of the main casing 91a, a discharge opening 14c that discharges the purge gas supplied from the purge gas supply apparatus, is provided opposed to the connection end of the supply side connector 21 engaged with the end of the opening.

Moreover a diffuser 92 that diffuses the purge gas discharged from the discharge opening 14c, is provided between the discharge opening 14c and the open end in the casing main body 91a.

The diffuser 92 is formed from a plurality of apertures 94 in a disc-shaped diffuser main body 93. In the diffuser 92 shown in FIG. 9, the construction is with the apertures 94 provided in a pattern radiating from the center.

In the casing 91 having such a construction, the connection sites can be contacted by the purge gas without bias since the purge gas discharged from the discharge opening 14c is supplied to the connection sites of the supply side connector 21 after being diffused by the diffuser 92, and the purging becomes certain and highly efficient.

Also, in the above embodiment, the example is shown where the inner cylinders 31 and 41 and the outer cylinders 32 and 42 are formed in simple cylindrical shapes. However the invention is not limited to this, and a member with one part in the axial direction constructed from a bellows may be used as one or more of the members from among these.

In this case, since the outer cylinder (or inner cylinder) with a part constructed by a bellows, is pressed against the other outer cylinder (or the other inner cylinder) by the elastic force in the bellows part when it touches the other outer cylinder (or the other inner cylinder), the degree of adhesion of the outer cylinder (or inner cylinder) is high.

Therefore, leakage of the fluid from the connection part of the outer cylinders (or connection part of the inner cylinders) is unlikely to occur with a connector using this construction, and especially in the case in which a cryogenic fluid such as liquefied hydrogen or the like are being handled, the reliability of such a connector is high in the case of use in applications in which heat shrinkage may occur in the outer cylinders or inner cylinders.

What is claimed is:

1. A connector that is used in a connection, to an object of supply, of a supply line that is used for the supply of fluid from a fluid supply apparatus to said object of supply, and a vent line that is used for the return of fluid from said object of supply to said fluid supply apparatus, and that constitutes a part of said supply line and said vent line itself, said connector comprising:

a supply side connector provided on said fluid supply apparatus;

an inlet side connector that is coupled detachably to said supply side connector, provided on said object of supply;

a first supply valve and a second supply valve that carry out restriction and allowance of the flow of said fluid through said supply line, said supply line being divided into a supply side supply line and an inlet side supply line, said first supply valve being provided on the supply side supply line of said supply side connector, and said second supply valve being provided on said inlet side supply line of said inlet side connector;

a vent valve that carries out restriction and allowance of the flow of said fluid through said vent line, said vent line being divided into a supply side vent line and an inlet side vent line, and said vent valve being provided on said inlet side vent line of said inlet side connector; and a valve opening and closing apparatus that operates the opening and closing of said first and second supply valves and said vent valve, wherein said supply side connector comprises a first inner cylinder, and said inlet side connector comprises a second inner cylinder, said first and second inner cylinders constituting connection parts of said supply side supply line and said inlet side supply line, said supply side connector comprises a first outer cylinder, and said inlet side connector comprises a second outer cylinder, said first and second outer cylinders enclosing said first and second inner cylinders, and said first and second outer cylinders constituting connection parts of said supply side vent line and said inlet side vent line, said first supply valve is provided in said first inner cylinder, and said second supply valve is provided in said second inner cylinder, said first and second supply valves being of a construction such as to carry out switching between restriction and release of the flow of said fluid through said supply side supply line and said inlet side supply line by changing their positions in the axial direction of said first and second inner cylinders, said vent valve is provided between said second outer cylinder and said second inner cylinder, and is of a construction such as to carry out switching between restriction and release of the flow of said fluid through said supply side vent line and said inlet side vent line by changing its position in said axial direction, said valve opening and closing apparatus is of a construction such as to operate opening and closing of said first and second supply valves and said vent valve by respectively moving them in the axial direction, said first supply valve of said supply side connector includes:

a supply side valve body that opens said supply side supply line in a state of being positioned on the upstream side on said supply side supply line of a shut off position that shuts off said supply side supply line, and a first biasing member that biases said supply side valve body toward the downstream side of said supply side supply line, said second supply valve of said inlet side connector includes:

an inlet side valve body that opens said inlet side supply line in a state of being positioned on the downstream side on said inlet side supply line of a shut off position that shuts off said inlet side supply line, and a second biasing member that biases said inlet side valve body toward the upstream side of said inlet side supply line, said vent valve includes:

a vent side valve body that opens said inlet side vent line in a state of being positioned on the upstream side on said inlet side vent line of a shut off position that shuts off said inlet side vent line, and a third biasing member that biases said vent side valve body toward the downstream side of said inlet side vent line, an end connection of said first outer cylinder of said supply side connector is of a construction such as to be projected further than an end connection of said first inner cylinder of said supply side connector, and to be inserted into said second outer cylinder of said inlet side connector in a process in which said supply side connector and said inlet side connector are coupled, inside said second inner cylinder of said inlet side connector there is provided a first presser part that contacts said supply side valve body in a state in which said first outer cylinder of said supply side connector is inserted into said second outer cylinder of said inlet side connector, and moves said supply side valve body from said shut off position toward the upstream side on said supply side supply line, inside said first inner cylinder of said supply side connector there is provided a second presser part that contacts said inlet side valve body in a state in which both said first and second inner cylinders are connected, and moves said inlet side valve body from said shut off position toward the downstream side of said inlet side supply line, on said first outer cylinder of said supply side connector there is provided a third presser part that contacts said vent side valve body in a state in which said first outer cylinder of said supply side connector is inserted into said second outer cylinder of said inlet side connector and both said first and second inner cylinders are connected, and moves said vent side valve body from said shut off position toward the upstream side of said inlet side vent line, said first biasing member, said second biasing member, said third biasing member, said first presser part, said second presser part, and said third presser part constitute said valve opening and closing apparatus, said inlet side valve body of said inlet side connector constitutes said first presser part, said supply side valve body of said supply side connector constitutes said second presser part, an end connection of said first outer cylinder of said supply side connector constitutes said third presser part, and a biasing force of said second biasing member is greater than that of said first biasing member, so that from when said supply side valve body and said inlet side valve body make contact until both said first and second inner cylinders are connected, only said supply side valve body is moved to the upstream side from said shut off position, and said inlet side valve body is held in said shut off position.

2. A fluid supply system of a construction such that a supply line used in the supply of fluid from a fluid supply apparatus to an object of supply, and a vent line used in the return of fluid from said object of supply to said fluid supply apparatus are connected to said object of supply using the connector according to claim 1.

3. A connector connection method for connecting a fluid supply apparatus and an object of supply using the connector according to claim 1, wherein said first and second supply valves and said vent valve are closed in a state in which said supply side connector and said inlet side connector are separated, the connection of both said first and second outer cylinders is carried out before the connection of both said first and second inner cylinders, said first supply valve is opened in this state so that flushing of the connection part of both said first and second inner cylinders, the connection part of both said first and second outer cylinders, and said supply side vent line of said supply side connection part is carried out by said fluid supplied from said supply side supply line of said supply side connector, after both said first and second inner cylinders are connected, said second supply valve of said inlet side connector is opened, and supply of fluid from said fluid supply apparatus to the object of supply begins, and said vent valve is opened and return of fluid from said object of supply to said fluid supply apparatus is carried out.

4. A connector separation method for separating a fluid supply apparatus and an object of supply that are connected using the connector according to claim 1, wherein said second supply valve of said inlet side connector and said vent valve are closed before the separation of both said first and second outer cylinders, and said inlet side supply line and said inlet side vent line of said inlet side connector are closed, both said first and second inner cylinders are separated and flushing of a connection part of both said first and second inner cylinders, a connection part of both said first and second outer cylinders, and said supply side vent line of said supply side connection part is carried out by said fluid supplied from said supply side supply line of said supply side connector, and both said first and second outer cylinders are separated after said first supply valve of said supply side connector is closed and the supply of said fluid from said supply side supply line of said supply side connector has stopped.

5. A connector that is used in a connection, to an object of supply, of a supply line that is used for the supply of fluid from a fluid supply apparatus to said object of supply, and a vent line that is used for the return of fluid from said object of supply to said fluid supply apparatus, and that constitutes a part of said supply line and said vent line itself, said connector comprising:

a supply side connector provided on said fluid supply apparatus;

an inlet side connector that is coupled detachably to said supply side connector, provided on said object of supply;

a first supply valve and a second supply valve that carry out restriction and allowance of the flow of said fluid through said supply line, said supply line being divided into a supply side supply line and an inlet side supply line, said first supply valve being provided on the supply side supply line of said supply side connector, and said second supply valve being provided on said inlet side supply line of said inlet side connector;

a vent valve that carries out restriction and allowance of the flow of said fluid through said vent line, said vent line being divided into a supply side vent line and an inlet side vent line, and said vent valve being provided on said inlet side vent line of said inlet side connector; and a valve opening and closing apparatus that operates the opening and closing of said first and second supply valves and said vent valve, wherein said supply side connector comprises a first inner cylinder, and said inlet side connector comprises a second inner cylinder, said first and second inner cylinders constituting connection parts of said supply side supply line and said inlet side supply line, said supply side connector comprises a first outer cylinder, and said inlet side connector comprises a second outer cylinder, said first and second outer cylinders enclosing said first and second inner cylinders, and said first and second outer cylinders constituting connection parts of said supply side vent line and said inlet side vent line, said first supply valve is provided in said first inner cylinder, and said second supply valve is provided in said second inner cylinder, said first and second supply valves being of a construction such as to carry out switching between restriction and release of the flow of said fluid through said supply side supply line and said inlet side supply line by changing their positions in the axial direction of said first and second inner cylinders, said vent valve is provided between said second outer cylinder and said second inner cylinder, and is of a construction such as to carry out switching between restriction and release of the flow of said fluid through said supply side vent line and said inlet side vent line by changing its position in said axial direction, said valve opening and closing apparatus is of a construction such as to operate opening and closing of said first and second supply valves and said vent valve by respectively moving them in the axial direction, a cylindrical cover is provided on at least one of said supply side connector and said inlet side connector, that encloses the connection ends of both the first and second outer cylinders in a state in which said first and second outer cylinders are in a state of opposition and are in proximity, and said cover has a purge gas supply apparatus that supplies purge gas into said cover, connected thereto.

6. A connector according to claim 5, wherein said cover doubles as a locking device that puts the connection locations of said supply side connector and said inlet side connector into a state of opposition and determines and fixes the position thereof, and a movement device that draws together and moves apart said supply side connector and said inlet side connector is provided on said cover.

7. A fluid supply system of a construction such that a supply line used in the supply of fluid from a fluid supply apparatus to an object of supply, and a vent line used in the return of fluid from said object of supply to said fluid supply apparatus are connected to said object of supply using the connector according to claim 5.

8. A connector connection method for connecting a fluid supply apparatus and an object of supply using the connector according to claim 5, wherein said first and second supply valves and said vent valve are closed in a state in which said supply side connector and said inlet side connector are separated, the connection of both said first and second outer cylinders is carried out before the connection of both said first and second inner cylinders, said first supply valve is opened in this state so that flushing of the connection part of both said first and second inner cylinders, the connection part of both said first and second outer cylinders, and said supply side vent line of said supply side connection part is carried out by said fluid supplied from said supply side supply line of said supply side connector, after both said first and second inner cylinders are connected, said second supply valve of said inlet side connector is opened, and supply of fluid from said fluid supply apparatus to the object of supply begins, and said vent valve is opened and return of fluid from said object of supply to said fluid supply apparatus is carried out.

9. A connector separation method for separating a fluid supply apparatus and an object of supply that are connected using the connector according to claim 5, wherein said second supply valve of said inlet side connector and said vent valve are closed before the separation of both said first and second outer cylinders, and said inlet side supply line and said inlet side vent line of said inlet side connector are closed, both said first and second inner cylinders are separated and flushing of a connection part of both said first and second inner cylinders, a connection part of both said first and second outer cylinders, and said supply side vent line of said supply side connection part is carried out by said fluid supplied from said supply side supply line of said supply side connector, and both said first and second outer cylinders are separated after said first supply valve of said supply side connector is closed and the supply of said fluid from said supply side supply line of said supply side connector has stopped.

10. A connector that is used in a connection, to an object of supply, of a supply line that is used for the supply of fluid from a fluid supply apparatus to said object of supply, and a vent line that is used for the return of fluid from said object of supply to said fluid supply apparatus, and that constitutes a part of said supply line and said vent line itself, said connector comprising:

a supply side connector provided on said fluid supply apparatus;

an inlet side connector that is coupled detachably to said supply side connector, provided on said object of supply;

a first supply valve and a second supply valve that carry out restriction and allowance of the flow of said fluid through said supply line, said supply line being divided into a supply side supply line and an inlet side supply line, said first supply valve being provided on the supply side supply line of said supply side connector, and said second supply valve being provided on said inlet side supply line of said inlet side connector;

a vent valve that carries out restriction and allowance of the flow of said fluid through said vent line, said vent line being divided into a supply side vent line and an inlet side vent line, and said vent valve being provided on said inlet side vent line of said inlet side connector; and a valve opening and closing apparatus that operates the opening and closing of said first and second supply valves and said vent valve, wherein said supply side connector comprises a first inner cylinder, and said inlet side connector comprises a second inner cylinder, said first and second inner cylinders constituting connection parts of said supply side supply line and said inlet side supply line, said supply side connector comprises a first outer cylinder, and said inlet side connector comprises a second outer cylinder, said first and second outer cylinders enclosing said first and second inner cylinders, and said first and second outer cylinders constituting connection parts of said supply side vent line and said inlet side vent line, said first supply valve is provided in said first inner cylinder, and said second supply valve is provided in said second inner cylinder, said first and second supply valves being of a construction such as to carry out switching between restriction and release of the flow of said fluid through said supply side supply line and said inlet side supply line by changing their positions in the axial direction of said first and second inner cylinders, said vent valve is provided between said second outer cylinder and said second inner cylinder, and is of a construction such as to carry out switching between restriction and release of the flow of said fluid through said supply side vent line and said inlet side vent line by changing its position in said axial direction, said valve opening and closing apparatus is of a construction such as to operate opening and closing of said first and second supply valves and said vent valve by respectively moving them in the axial direction, and a part in the axial direction of at least one of said first outer cylinder and said first inner cylinder of said supply side connector, and said second outer cylinder and said second inner cylinder of said inlet side connector is constructed by a bellows.

11. A fluid supply system of a construction such that a supply line used in the supply of fluid from a fluid supply apparatus to an object of supply, and a vent line used in the return of fluid from said object of supply to said fluid supply apparatus are connected to said object of supply using the connector according to claim 10.

12. A connector connection method for connecting a fluid supply apparatus and an object of supply using the connector according to claim 10, wherein said first and second supply valves and said vent valve are closed in a state in which said supply side connector and said inlet side connector are separated, the connection of both said first and second outer cylinders is carried out before the connection of both said first and second inner cylinders, said first supply valve is opened in this state so that flushing of the connection part of both said first and second inner cylinders, the connection part of both said first and second outer cylinders, and said supply side vent line of said supply side connection part is carried out by said fluid supplied from said supply side supply line of said supply side connector, after both said first and second inner cylinders are connected, said second supply valve of said inlet side connector is opened, and supply of fluid from said fluid supply apparatus to the object of supply begins, and said vent valve is opened and return of fluid from said object of supply to said fluid supply apparatus is carried out.

13. A connector separation method for separating a fluid supply apparatus and an object of supply that are connected using the connector according to claim 10, wherein said second supply valve of said inlet side connector and said vent valve are closed before the separation of both said first and second outer cylinders, and said inlet side supply line and said inlet side vent line of said inlet side connector are closed, both said first and second inner cylinders are separated and flushing of a connection part of both said first and second inner cylinders, a connection part of both said first and second outer cylinders, and said supply side vent line of said supply side connection part is carried out by said fluid supplied from said supply side supply line of said supply side connector, and both said first and second outer cylinders are separated after said first supply valve of said supply side connector is closed and the supply of said fluid from said supply side supply line of said supply side connector has stopped.

14. A fluid supply apparatus comprising:

a casing in which a supply side connector is housed, wherein said supply side connector, together with an inlet side connector provided on an object of supply of fluid, comprises a connector to said object of supply of, a supply line that is used for the supply of said fluid from said fluid supply apparatus to said object of supply, and a vent line that is used for the return of fluid from said object of supply to said fluid supply apparatus, and constitutes said supply line and said vent line in said connector, wherein said supply line is divided into a supply side supply line and an inlet side supply line, and said vent line is divided into a supply side vent line and an inlet side vent line, said supply side connector comprising:

a supply valve provided on said supply side supply line, said supply valve carrying out restriction and allowance of the flow of said fluid through said supply side supply line;

a valve opening and closing apparatus that operates opening and closing of said supply valve;

an inner cylinder that constitutes the connector of said supply side supply line of said supply side connector with said inlet side supply line of said inlet side connector; and an outer cylinder that encloses said inner cylinder and that constitutes a connection part of said supply side vent line of said supply side connector and said inlet side vent line of said inlet side connector, said supply valve being provided inside said inner cylinder and being of a construction in which switching between restriction and release of the flow of said fluid through said supply side supply line is carried out by changing position in the axial direction of said inner cylinder, and said valve opening and closing apparatus being of a construction such as to control the opening and closing of said supply valve by moving said supply valve in the axial direction, and wherein said fluid supply apparatus further comprises a purge gas supply apparatus that supplies purge gas inside said casing.

15. A fluid supply apparatus according to claim 14, wherein a discharge opening through which said purge gas supplied from said purge gas supply apparatus is discharged, is provided at a position in said casing opposed to a connection site of said supply side connector with said inlet side connector, and a diffuser that diffuses said purge gas discharged from said discharge opening is provided at said discharge opening.

* * * * *